(12) United States Patent
Barovic

(10) Patent No.: US 12,481,859 B2
(45) Date of Patent: Nov. 25, 2025

(54) ELECTRONIC DEVICES WITH SIDEWALL PASSAGEWAYS

(71) Applicant: CHIPOLO, D.O.O., Trbovlje (SI)

(72) Inventor: Domen Barovic, Trbovlje (SI)

(73) Assignee: CHIPOLO, D.O.O., Trbovlje (SI)

( * ) Notice: Subject to any disclaimer, the term of this patent is extended or adjusted under 35 U.S.C. 154(b) by 57 days.

(21) Appl. No.: 18/389,718

(22) Filed: Dec. 19, 2023

(65) Prior Publication Data

US 2024/0211717 A1    Jun. 27, 2024

Related U.S. Application Data

(60) Provisional application No. 63/435,205, filed on Dec. 23, 2022.

(51) Int. Cl.
G06K 19/077    (2006.01)
A45C 11/00    (2006.01)
G06K 19/07    (2006.01)

(52) U.S. Cl.
CPC ........ *G06K 19/07758* (2013.01); *A45C 11/00* (2013.01); *G06K 19/0702* (2013.01); *A45C 11/002* (2025.01); *A45C 11/003* (2025.01)

(58) Field of Classification Search
CPC .......... G06K 19/07758; G06K 19/0702; A45C 11/00; A45C 11/002; A45C 11/003
See application file for complete search history.

(56) References Cited

U.S. PATENT DOCUMENTS

| | | | | |
|---|---|---|---|---|
| D801,200 S | * | 10/2017 | Farley | D10/70 |
| 9,846,854 B1 | * | 12/2017 | Lee | G06Q 10/0833 |
| 10,568,035 B1 | * | 2/2020 | Tong | H04W 4/80 |
| D953,905 S | | 6/2022 | Barovic | |
| D969,637 S | * | 11/2022 | Umair | D10/70 |
| D996,995 S | * | 8/2023 | Barovic | D10/104.1 |
| D1,046,651 S | * | 10/2024 | Hopkins | D10/104.1 |
| 12,106,167 B1 | * | 10/2024 | Hopkins | H01M 50/213 |
| 12,264,773 B1 | * | 4/2025 | Hopkins | F16M 11/04 |
| 2002/0104013 A1 | * | 8/2002 | Ghazarian | G08B 13/2454 726/27 |
| 2015/0359127 A1 | * | 12/2015 | Daoura | G08B 21/24 361/752 |
| 2016/0210547 A1 | * | 7/2016 | Dekeyser | G06K 7/065 |
| 2017/0262668 A1 | * | 9/2017 | Lim | H04W 4/80 |
| 2017/0280688 A1 | * | 10/2017 | Deliou | G06K 7/10297 |
| 2019/0019076 A1 | * | 1/2019 | Daoura | H04L 67/10 |
| 2019/0103012 A1 | * | 4/2019 | Daoura | G08B 21/0247 |
| 2022/0101992 A1 | * | 3/2022 | Porter | G06K 7/10366 |
| 2023/0237895 A1 | * | 7/2023 | Stout | G06K 19/0723 340/539.2 |
| 2023/0267820 A1 | * | 8/2023 | Kutzke | G08B 21/18 340/539.13 |
| 2024/0242304 A1 | * | 7/2024 | Hunter | G01C 21/3438 |
| 2024/0254809 A1 | * | 8/2024 | Wright | F16M 13/04 |
| 2024/0275421 A1 | * | 8/2024 | Storey | A45C 11/00 |
| 2024/0362994 A1 | * | 10/2024 | Daoura | G08C 17/02 |

* cited by examiner

*Primary Examiner* — Thien M Le
*Assistant Examiner* — Asifa Habib
(74) *Attorney, Agent, or Firm* — Van Court & Aldridge LLP

(57) ABSTRACT

Electronic devices with sidewall passageways and methods for making and using the same are provided.

21 Claims, 26 Drawing Sheets

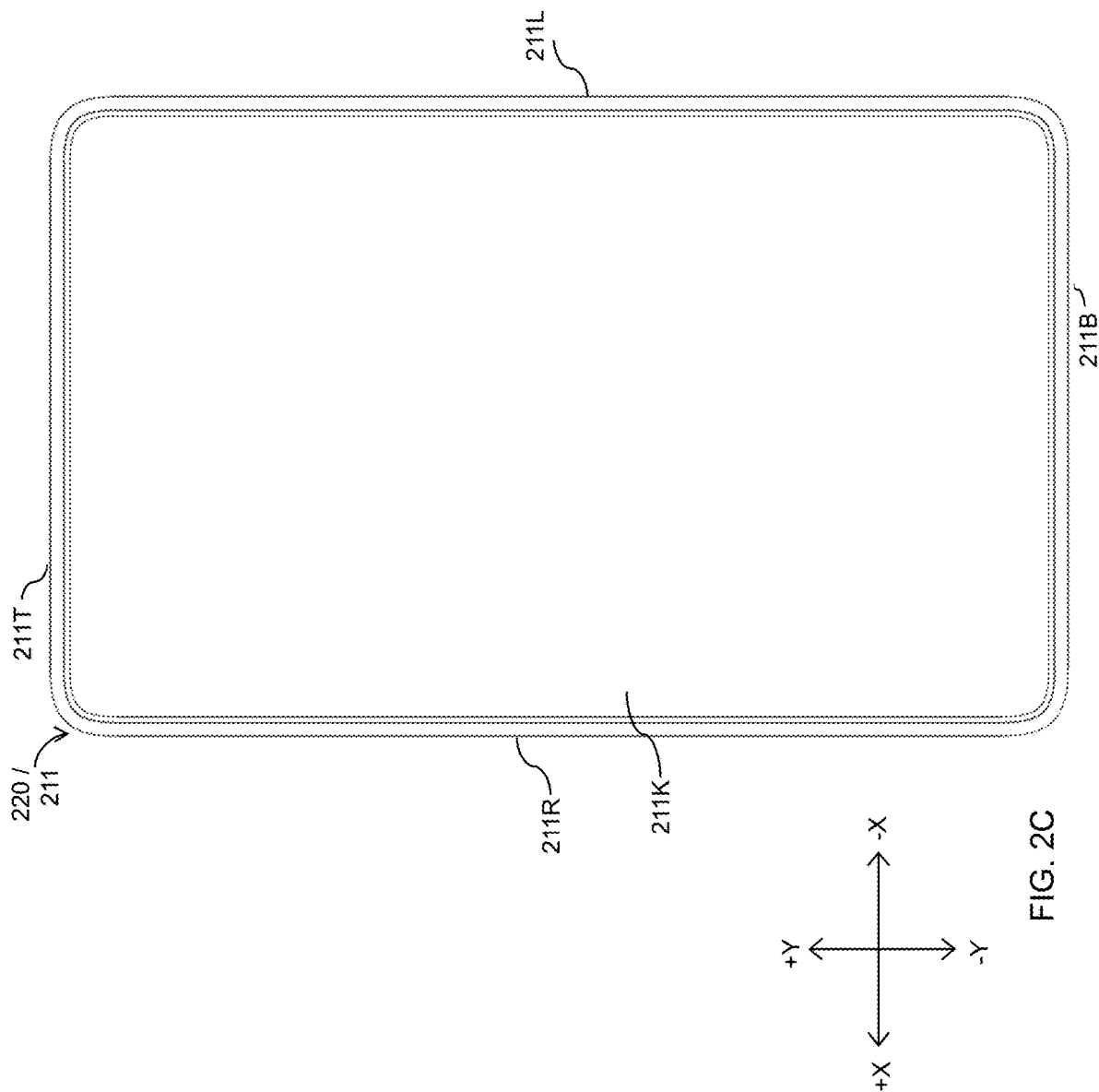

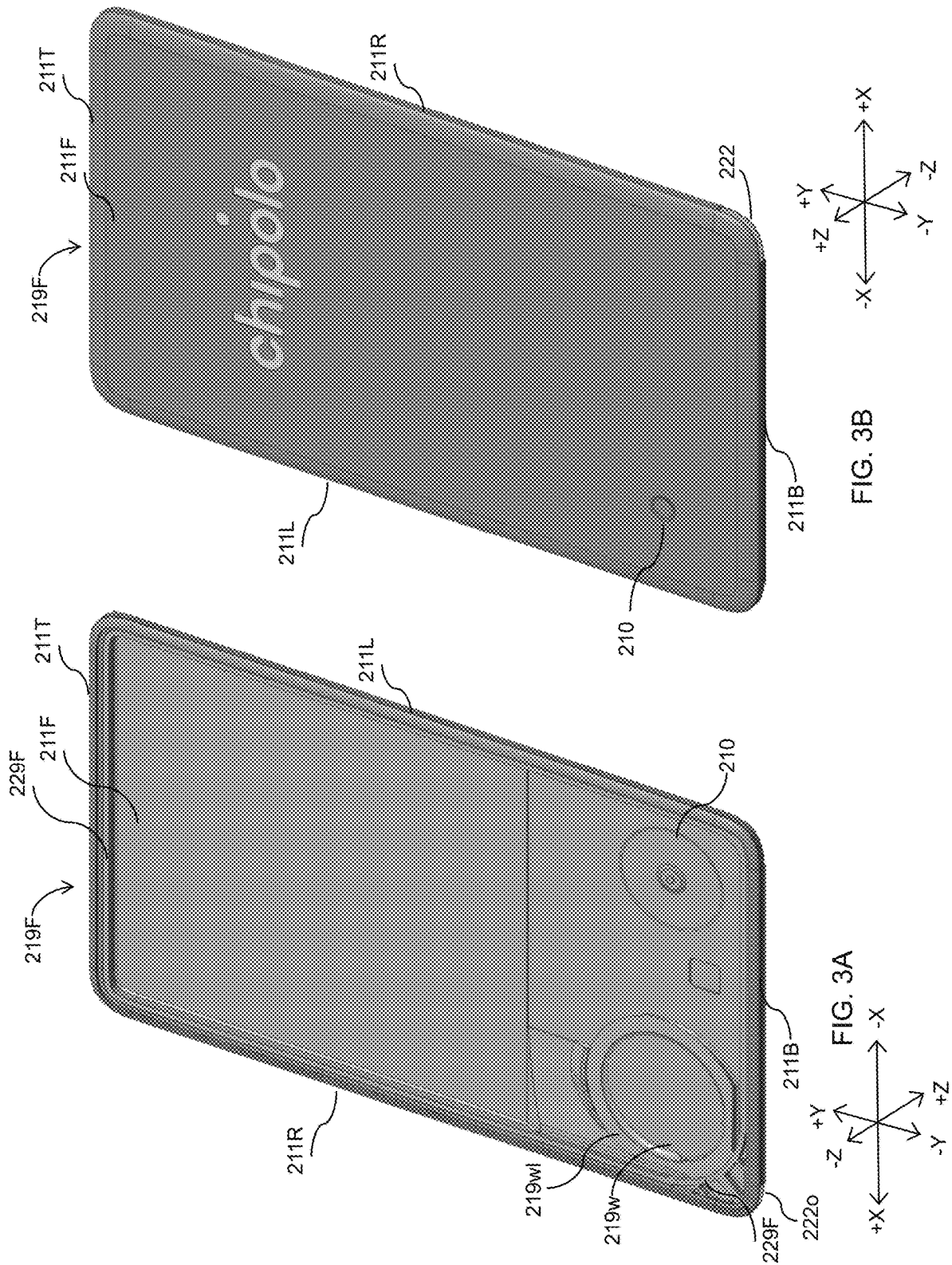

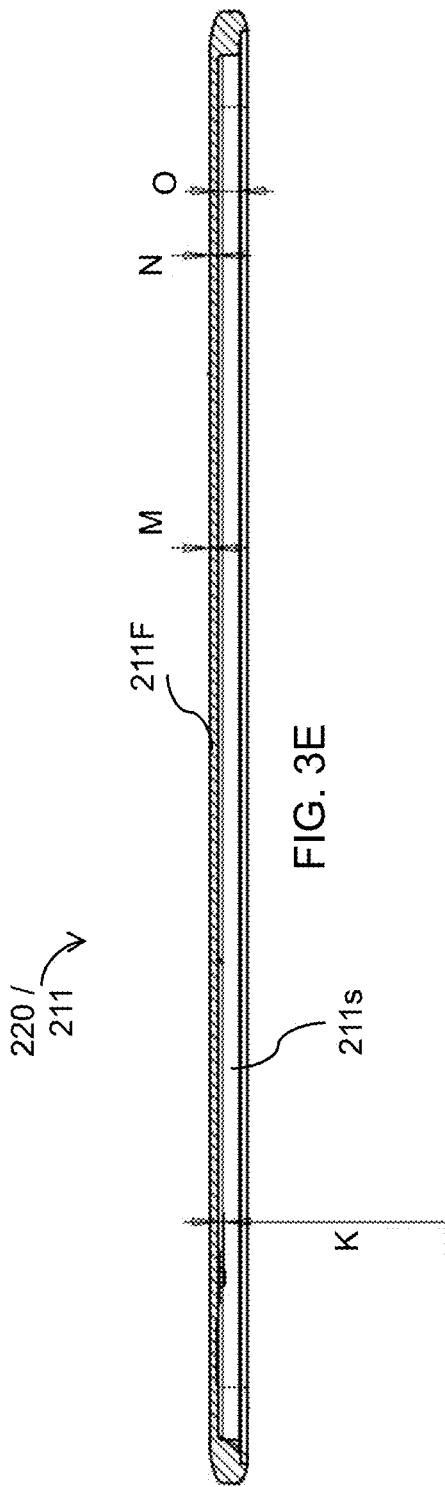

ELECTRONIC DEVICES WITH SIDEWALL PASSAGEWAYS

CROSS-REFERENCE TO RELATED APPLICATION(S)

This application claims the benefit of prior filed U.S. Provisional Patent Application No. 63/435,205, filed Dec. 23, 2022, which is hereby incorporated by reference herein in its entirety.

COPYRIGHT NOTICE

At least a portion of the disclosure of this patent document contains material that may be subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to electronic devices with sidewall passageways and, more particularly, to electronic tracking devices with sidewall passageways for output components.

BACKGROUND OF THE DISCLOSURE

Users can attach tracking devices to one or more personal objects, such as keys, a wallet, and the like. The tracking device can communicatively couple to a mobile device of the user and/or to a device of a community member. However, currently, such devices present information to users via output components that are inefficient and ineffective.

SUMMARY OF THE DISCLOSURE

This document describes electronic devices with sidewall passageways and methods for making and using the same.

For example, an electronic tracking device is provided that may include a housing defining a housing space, wherein the housing includes a housing wall with an exterior housing wall surface defining at least a portion of an exterior of the housing, the exterior housing wall surface is less than 5.0 millimeters in at least a first dimension, the exterior housing wall surface includes a passageway opening therethrough, and the housing space includes a communication component space, and a passageway extending between the communication component space and the passageway opening. The electronic tracking device may also include a processor positioned within the housing space, a battery positioned within the housing space and coupled to the processor, and a communication component positioned within the communication component space and operative to communicate fluid with an environment external to the housing via the passageway.

As another example, an electronic tracking device is provided that may include a housing defining a housing space, wherein the housing includes a housing wall with an exterior housing wall surface defining at least a portion of an exterior of the housing, the exterior housing wall surface includes a passageway opening through the exterior housing wall surface, the passageway opening is less than 1.0 millimeter tall, and the housing space includes an internal component space, and a passageway extending between the internal component space and the passageway opening. The electronic tracking device may also include an audio component positioned within the internal component space and operative to communicate soundwaves with an environment external to the housing via the passageway.

As yet another example, an electronic tracking device is provided that may include a housing defining an internal housing space, and an internal component positioned within the internal housing space, wherein the housing includes at least one housing wall with an exterior housing wall surface, the housing space includes a passageway extending between the internal component and an environment external to the housing via an opening in the exterior housing wall surface, and the opening is less than 5.0 millimeters in at least one dimension.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 2C is a rear view of the device of FIGS. 2, 2A, and 2B, according to some embodiments of the disclosure;

FIG. 3A is a bottom, rear, left side perspective view of a housing portion of the device of FIGS. 2 and 2A-2F and 3, according to some embodiments of the disclosure;

FIG. 3B is a bottom, front, right side perspective view of the housing portion of the device of FIGS. 2 and 2A-2F and 3 and 3A, according to some embodiments of the disclosure;

FIG. 3E is a cross-section view of the housing portion of the device of FIGS. 2 and 2A-2F and 3 and 3A-3D, taken from line IIIE-IIIE of FIG. 3C, according to some embodiments of the disclosure;

DETAILED DESCRIPTION OF THE DISCLOSURE

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

Figure 1:
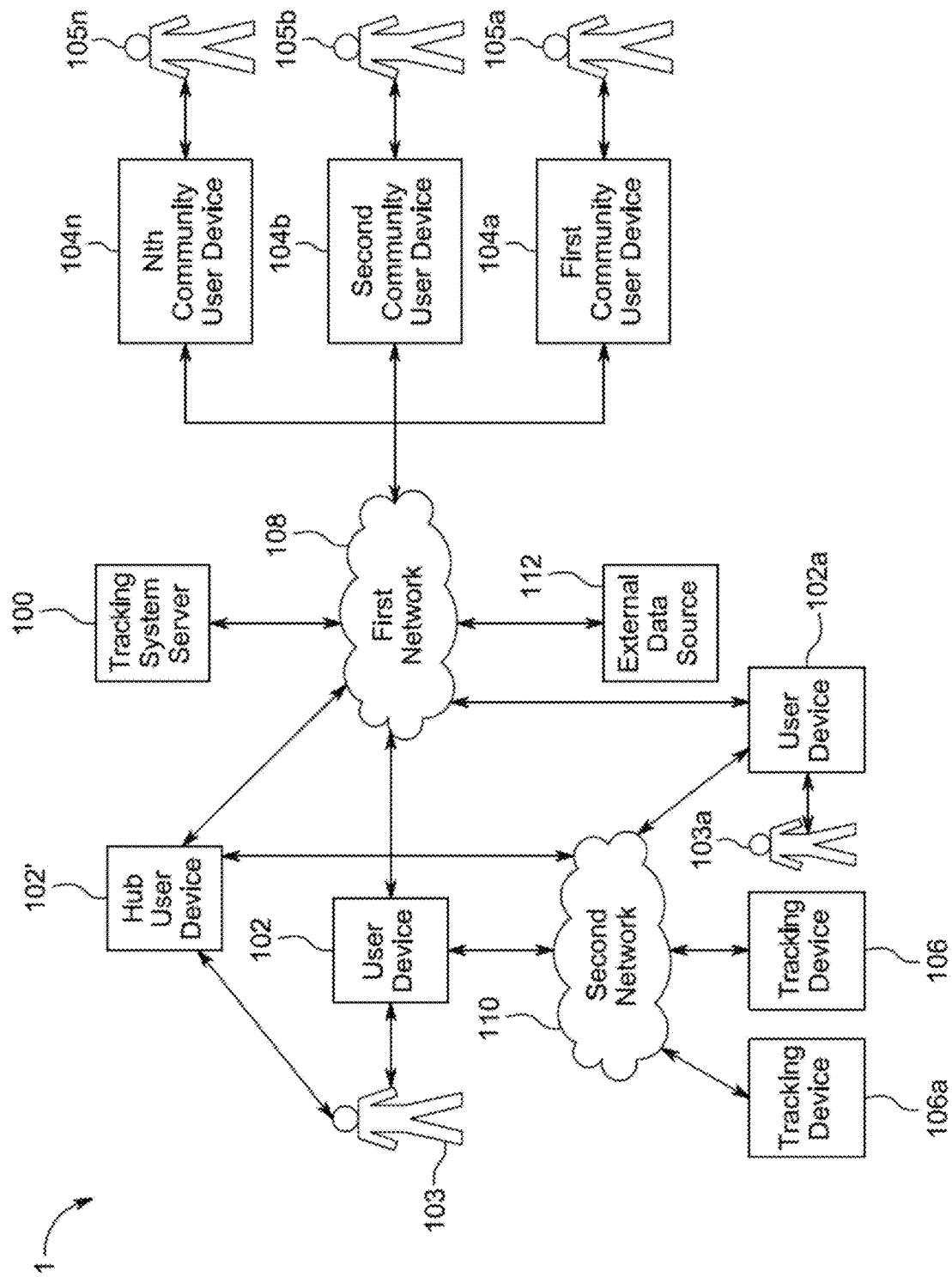
FIG. 1 is a schematic diagram illustrating an exemplary tracking system environment in which a tracking device can be monitored, according to some embodiments of the disclosure.

FIG. 1 illustrates an example tracking environment or tracking system 1 in which an electronic tracking device and an electronic user device can operate. System 1 may include a tracking system server 100 (e.g., a system of one or more servers or other suitable computing devices) that may be communicatively coupled via a first network 108 to a particular or of interest user device 102 that may be associated with a particular or of interest user 103. Tracking system server 100 may also be communicatively coupled via first network 108 to at least one additional user device 102a that may be associated with another particular user 103a (e.g., a user with a particular relationship to user 103, such as a sibling or partner or roommate or the like of user 103 with whom user 103a may share one or more tracking devices (e.g., a tracking device 106)). Tracking system server 100 may also be communicatively coupled via first network 108 to a plurality of community user devices 104a-104n (e.g., as may be collectively referred to herein as "community user devices 104") that may be respectively associated with a plurality of community users 105a-105n (e.g., as may be collectively referred to herein as "community users 105"). Tracking system 1 may be configured to enable user 103 to manage and/or locate a particular or of interest tracking device 106 that may be associated with user 103 and user device 102. For example, user 103 can attach such a tracking device 106 to or enclose such a tracking device 106 within an object (not shown), such as a wallet, keys, a car, a bike, a pet, or any other object that the user may want to track. User 103 can then use user device 102 (e.g., a mobile device or other device (e.g., by way of a software application installed on the device) or service) to track the tracking device and corresponding object. For example, user device 102 may be configured to perform a local search for a tracking device 106 attached to a nearby object. However, in situations where user 103 may be unable to locate tracking device 106 using their own user device 102 (e.g., if tracking device 106 is beyond a distance within which user device 102 and tracking device 106 can communicate), user 103 can utilize the capabilities of a community of users of tracking system 1.

In some embodiments, tracking system 1 may be configured to utilize the capabilities of community user devices 104 to locate tracking device 106 if the location of the tracking device is unknown to user 103 and beyond the capabilities of user device 102 to track. In some configurations, user 103 may be associated with (e.g., own and/or control) and register multiple tracking devices 106. Although FIG. 1 illustrates a particular arrangement of tracking system 1, user device 102, community user devices 104, and tracking device 106, various additional arrangements are possible. FIG. 1 also illustrates an external data source 112 that may be communicatively coupled to tracking system server 100 to provide additional, external data to tracking system 1, such as data from one or more social networking systems, messaging systems, calendaring systems, banking systems, budgeting systems, vendor systems, online retailers, parking regulation databases, weather service, travel agency, transportation services, ride-sharing systems, geo-locating systems, contact management systems, and/or the like, as may be described by U.S. Patent Application Publication No. 2017-0352250, which is hereby incorporated by reference herein in its entirety.

In some configurations, user 103 may be part of the community of users 105. Further, one or more users 105 may own and register one or more tracking devices 106. Thus, any one of the users within the community of users 105 can communicate with tracking system server 100 and utilize the capabilities of the community of users 105 in addition to user 103 to locate a tracking device 106 that has been lost.

Tracking system server 100, user device 102, and plurality of community user devices 104 may communicate using any communication platforms and technologies suitable for transporting data and/or communication signals, including known communication technologies, devices, media, and protocols supportive of remote data communications.

In certain embodiments, tracking system server 100, user device 102, and community user devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between tracking system server 100, user device 102, and community user devices 104. User device 102 may also be in communication with a tracking device 106 via a second network 110 (e.g., device 102 may be communicatively coupled to tracking device 106 via its own communication network 110 (e.g., a Bluetooth link)). User device 102a may also be in communication with tracking device 106 (e.g., a shared tracking device between users 103 and 103a of respective user devices 102/102' and 102a), such as where user device 102a may be communicatively coupled to tracking device 106 via communication network 110 or another distinct communication network (not shown) (e.g., a Bluetooth link)). One or more community user devices 104 may also be able to be communicatively coupled to tracking device 106 via any suitable communication network (e.g., Bluetooth link) (not shown). Second network 110 may be a similar or different type of network as first network 108. In some embodiments, second network 110 may include a wireless network with a limited communication range, such as, but not limited to, a Bluetooth or Bluetooth Low Energy ("BLE") or ultra-wideband ("UWB") wireless network (e.g., any suitable personal area network). In some configurations, second network 110 may be a point-to-point network that may include tracking device 106 and one or more user devices that may fall within a proximity of tracking device 106. In such embodiments, each one of user device 102 and community user devices 104 may only be able to communicate with tracking device 106 if it is within a close proximity to the tracking device, though in other embodiments, the tracking device can use long-distance communication functionality (e.g., for instance, a GSM transceiver) to communicate with either a user device 102/104 or tracking system server 100 at any distance. In some configurations, user device 102 and one or more community user devices 104 may each be associated with multiple tracking devices associated with various users.

As shown, in some embodiments, tracking system 1 may be configured to enable user 103 to manage and/or locate another user device 102' (e.g., a hub user device) that may be associated with user 103 and may be operative to track at least tracking device 106 (e.g., via second network 110 or a similar but distinct network (e.g., a unique Bluetooth link)). Unlike user device 102 that may be configured to be mobile and travel with user 103 wherever user 103 may go, hub user device 102' may be configured to be stationary (e.g., a stationary or hub user device may be coupled to a wall hanging next to the front door of a user's home or elsewhere at or near a user-specific location, which may be stationary throughout a user's use of system 1). A stationary hub user device at a particular location (e.g., the user's home, the user's office, the user's vehicle, etc.) may act as a device that may periodically scan for a user's tracking device and report to the web server or the main user device if the tracking device is close to the hub user device. For example, tracking system server 100 may be continuously communicatively coupled or couplable to hub user device 102' (e.g., via first network 108) such that server 100 may be enabled to routinely determine if a tracking device is communicatively coupled to the hub user device and determine the location (e.g., stationary location) of the hub user device (e.g., such that server 100 may be enabled to determine if tracking device 106 remains at a user's home via communication with a home hub user device. Like any user device, it is to be appreciated that hub user device 102' may be configured to scan for or otherwise communicatively couple with any tracking device regardless of whether or not the tracking device shares an owner with the hub user device.

As shown in FIG. 1, user device 102 may be associated with user 103. User device 102 can be configured to perform one or more functions described herein with respect to locating tracking devices (e.g., tracking device 106). For example, user device 102 can receive input from user 103 that may be representative of information about user 103 and information about a tracking device 106, and then user device 102 may provide the received user information, tracking device information, and/or information about user device 102 to tracking system server 100. Accordingly, tracking system server 100 may be able to associate user device 102, user 103, and/or tracking device 106 with one another. In some embodiments, user device 102 can communicate with tracking device 106 and provide information regarding the location of the tracking device to user 103. For example, user device 102 can detect a communication signal from tracking device 106 (e.g., by way of second network 110) as well as a strength of the communication signal and/or other measure of proximity to determine an approximate distance (and/or a relative direction) between user device 102 and tracking device 106. User device 102 can then provide this information to user 103 (e.g., by way of one or more user interfaces of user device 102) to assist user 103 to locate tracking device 106. Accordingly, user 103 can use user device 102 to track and locate tracking device 106 and, thus, a corresponding object associated with tracking device 106. If user device 102 is located beyond an immediate range of communication with tracking device 106 (e.g., beyond a communication range of second network 110), user device 102 may be configured to send an indication that tracking device 106 is lost (e.g., out-of-range) to tracking system server 100, which may request assistance in finding the tracking device. User device 102 can send an indication of a lost tracking device in response to a command from user 103. For example, once user 103 has determined that tracking device 106 is lost, the user can provide user input to user device 102 (e.g., by way of a user interface), requesting that user device 102 send an indication that tracking device 106 is lost to tracking system server 100. In some examples, a lost indication can include information identifying user 103 (e.g., name, username, authentication information), information associated with user device 102 (e.g., a mobile phone number or any other suitable user device identifier), information associated with the tracking device (e.g., a unique tracking device identifier), and/or a location of the user (e.g., a GPS location of user device 102 at the time the request is sent).

Tracking system server 100 can be configured to provide a number of features and services associated with the tracking and management of a plurality of tracking devices and/or users associated with the tracking devices. For example, tracking system server 100 can manage information and/or user profiles associated with user 103 and community users 105. In particular, tracking system server 100 can manage information associated with tracking device 106 and/or other tracking devices (e.g., tracking device 106a) associated with user 103 and/or the community users 105.

Tracking system server 100 can receive an indication that tracking device 106 is out-of-range or lost from user device 102. Tracking system server 100 can then process the indication in order to help user 103 find tracking device 106. For example, tracking system server 100 can utilize the capabilities of community user devices 104 to help find tracking device 106. In particular, tracking system server 100 may set a flag for a tracking device 106 to indicate that the tracking device 106 is lost and monitor communications received from one or more of community user devices 104 that may indicate the location of one or more tracking devices 106 within proximity of such community user device(s) 104. Tracking system server 100 may be configured to determine whether a specific location is associated with a lost tracking device 106 and may provide any location updates associated with the tracking device 106 to user device 102. In one example, tracking system server 100 may receive constant updates of tracking device 106 locations regardless of whether a tracking device 106 is lost and provide a most recent updated location of tracking device 106 in response to receiving an indication that the tracking device is lost.

In some configurations, tracking system server 100 can send a location request associated with a tracking device 106 to one, some, or each of community user devices 104. The location request can include any instructions and/or information necessary for the community user device(s) 104 to find a tracking device 106. For example, a location request can include a unique identifier associated with tracking device 106 that can be used by one, some, or each community user device 104 to identify the tracking device. Accordingly, if one of the community devices detects a communication from the tracking device (e.g., if the community user device is within range or moves within range of the communication capabilities of the tracking device (e.g., via second network 110) and receives a signal from the tracking device including or associated with the unique identifier associated with the tracking device), the community user device may be configured to inform the tracking system server. Using the information received from the community user device(s) 104, tracking system server 100 may be configured to inform the user (e.g., by way of user device 102) of a potential location of tracking device 106.

Tracking system server 100 may be configured to communicate with a plurality of community user devices 104 associated with corresponding community users 105. For example, an implementation may include a first community user device 104a associated with a first community user 105a, a second community user device 104b associated with a second community user 105b, and additional communication user devices associated with additional community users up to an Nth community user device 104n associated with an Nth community user 105n. Community user devices 104 may also include functionality that may enable each community user device 104 to identify a tracking device 106 within a proximity of the community user device 104. In one example, a first community user device 104a within proximity of a tracking device 106 can communicate with the tracking device, identify the tracking device (e.g., using a unique identifier associated with the tracking device), and/or detect a location associated with the tracking device (e.g., a location of the first user community device at the time of the communication with the tracking device). This information can be used to provide updated locations and/or respond to a location request from tracking system server 100 regarding the tracking device. In some embodiments, the operations performed by the first community user device 104a can be hidden from first community user 105a. Accordingly, first community user device 104a can assist in locating the tracking device without bother and without the knowledge of first community user 105a.

Tracking system server 100 can assist user 103 in locating tracking device 106. The tracking device may be a chip, tile, tag, or other device for housing circuitry and that may be attached to or enclosed within an object, such as a wallet, keys, purse, car, or other object that the user may track. For example, the tracking device may be provided in the shape and size of a credit card or coin that may be properly held by a wallet, or in the shape and size of a keychain that may be properly coupled to one or more keys. Additionally, the tracking device may include a speaker for emitting a sound and/or a transmitter for broadcasting a beacon and/or a microphone for detecting sound or any other suitable transceiver or other suitable component(s). In one configuration, the tracking device may periodically transmit a beacon signal that may be detected using a nearby user device 102 and/or community user device 104. In some configurations, tracking device 106 may broadcast a beacon at regular intervals (e.g., one second intervals) that may be detected from a nearby user device (e.g., community user device 104a). The strength of the signal emitted from the tracking device may be used to determine a degree of proximity to user device 102 or community user device 104 that detects the signal. For example, a higher strength signal may indicate a close proximity between tracking device 106 and user device 102 and a lower strength signal may indicate a more remote proximity between tracking device 106 and user device 102, though in some embodiments, tracking device 106 may intentionally vary the transmission strength of the beacon signal. In some cases, the strength of signal or absence of a signal may be used to indicate that a tracking device is out-of-range or lost.

Figure 1A:
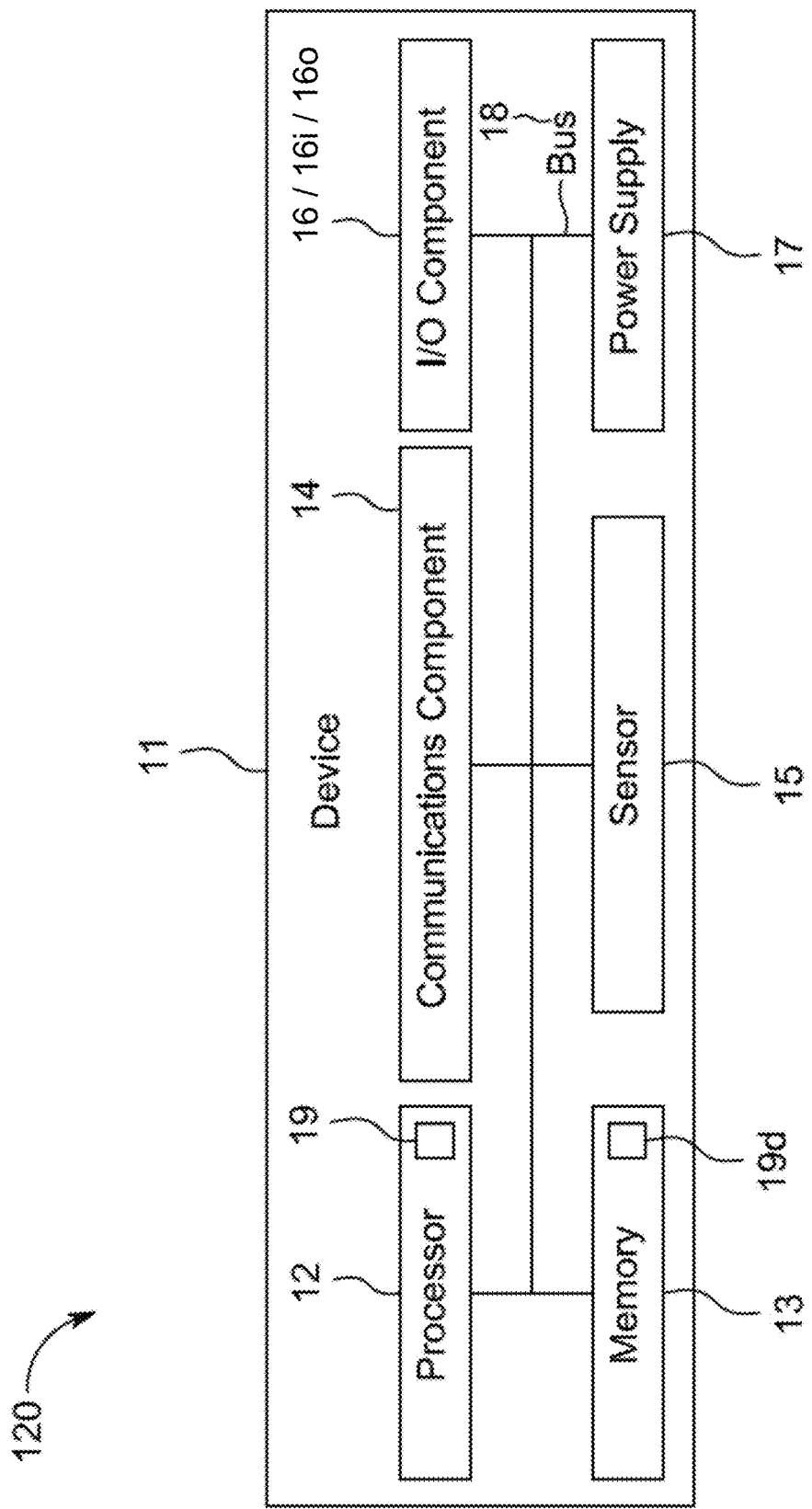
FIG. 1A is a more detailed schematic view of a system device of the system of FIG. 1, according to some embodiments of the disclosure.

As shown in FIG. 1A, an electronic device 120 (e.g., one, some, or each of servers/devices 100, 102, 102', 102a, 104a-104n, 106, and 112 of system 1 of FIG. 1) may include any suitable components or modules, including, but not limited to, a processor component 12, a memory component 13, a communications component 14, a sensor 15, an input/output ("I/O") component 16, a power supply component 17, a housing 11, and/or a bus 18 that may provide one or more wired or wireless communication links or paths for transferring data and/or power to, from, or between various other components of device 120. In some embodiments, one or more components of device 120 may be combined or omitted. Moreover, device 120 may include other components not combined or included in FIG. 1A and/or several instances of the components shown in FIG. 1A. For the sake of simplicity, only one of each of the components of device 120 is shown in FIG. 1A. I/O component 16 may include at least one input component (e.g., an input component 16*i* (e.g., a button, mouse, keyboard, sensor, microphone, etc.)) to receive information from a user and/or at least one output component (e.g., an output component 16o (e.g., an audio speaker, video display, haptic component, etc.)) to provide information to a user, such as a touch screen that may receive input information through a user's touch of a display screen and that may also provide visual information to a user via that same display screen. Memory 13 may include one or more storage mediums or media, including for example, a hard-drive, flash memory, permanent memory such as read-only memory ("ROM"), semi-permanent memory such as random access memory ("RAM"), any other suitable type of storage component, or any combination thereof (e.g., for storing data (e.g., unique user device identifier information, unique tracking device identifier information, unique user identifier information, tracking device coupling event data, tracking device decoupling event data, shared location/connection data, models, neural networks, algorithms, out of range ("OOR") application data, etc. (e.g., data 19*d*))). Communications component 14 may be provided to allow device 120 to communicate with one or more other devices 120 (e.g., any suitable communication via any suitable network (e.g., network 108, 110, etc. of system 1)) using any suitable communications protocol. Communications component 14 can be operative to create or connect to a communications network or link of a network. Communications component 14 can provide wireless communications using any suitable short-range or long-range communications protocol, such as Wi-Fi (e.g., an 802.11 protocol), Bluetooth, BLE, radio frequency systems (e.g., 1200 MHZ, 2.4 GHz, and 5.6 GHz communication systems), ultra-wideband, near field communication ("NFC"), infrared, protocols used by wireless and cellular telephones and personal e-mail devices, or any other protocol supporting wireless communications. Communications component 14 can also be operative to connect to a wired communications link or directly to another data source wirelessly or via one or more wired connections. Communications component 14 may be a network interface that may include the mechanical, electrical, and/or signaling circuitry for communicating data over physical links that may be coupled to other devices of a network. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access.

Sensor 15 may be any suitable sensor that may be configured to sense any suitable data for device 120 (e.g., location-based data via a global positioning system ("GPS") sensor system or any other suitable location determination protocol, motion data, environmental data, biometric data, etc.). Sensor 15 may be a sensor assembly that may include any suitable sensor or any suitable combination of sensors operative to detect movements of device 120 and/or of any user thereof and/or any other characteristics of device 120 and/or of its environment (e.g., physical activity or other characteristics of a user of device 120, light content of the device environment, gas pollution content of the device environment, noise pollution content of the device environment, altitude of the device, etc.). Sensor 15 may include any suitable sensor(s), including, but not limited to, one or more of a GPS sensor, wireless communication sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 15 may include any suitable sensor components or subassemblies for detecting any suitable movement of device 120 and/or of a user thereof. For example, sensor 15 may include one or more three-axis acceleration motion sensors (e.g., an accelerometer) that may be operative to detect linear acceleration in three directions (i.e., the x- or left/right direction, the y- or up/down direction, and the z- or forward/backward direction). As another example, sensor 15 may include one or more single-axis or two-axis acceleration motion sensors that may be operative to detect linear acceleration only along each of the x- or left/right direction and the y- or up/down direction, or along any other pair of directions. In some embodiments, sensor 15 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 15 may be operative to directly or indirectly detect rotation, rotational movement, angular displacement, tilt, position, orientation, motion along a non-linear (e.g., arcuate) path, or any other non-linear motions. Additionally or alternatively, sensor 15 may include one or more angular rate, inertial, and/or gyro-motion sensors or gyroscopes for detecting rotational movement. For example, sensor 15 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 15 for detecting motion on device 120, such as any suitable pressure sensors, altimeters, or the like. Using sensor 15, device 120 may be configured to determine a velocity, acceleration, orientation, and/or any other suitable motion attribute of device 120. One or more biometric sensors may be multi-modal biometric sensors and/or operative to detect long-lived biometrics, modern liveness (e.g., active, passive, etc.) biometric detection, and/or the like. Sensor 15 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial) recognition sensor, which may operate in conjunction with a feature-processing application that may be accessible to device 120 for attempting to authenticate a user), line-in connector for data and/or power, and/or combinations thereof. In some examples, each sensor can be a separate device, while, in other examples, any combination of two or more of the sensors can be included within a single device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single device. Device 120 can further include a timer that can be used, for example, to add time dimensions to various attributes of any detected element(s). Sensor 15 may include any suitable sensor components or subassemblies for detecting any suitable characteristics of any suitable condition of the lighting of the environment of device 120. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of device 120 (e.g., in lux or lumens per square meter, etc.) and/or for determining the ambient color or white point chromaticity of ambient light in the environment of device 120 (e.g., in hue and colorfulness or in x/y parameters with respect to an x-y chromaticity space, etc.) and/or for determining the UV index or UV radiation in the environment of device 120 (e.g., in UV index units, etc.). Sensor 15 may include any suitable sensor components or subassemblies for detecting any suitable characteristics of any suitable condition of the air quality of the environment of device 120. For example, sensor 15 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of device 120 (e.g., in $O_2$% per liter, etc.) and/or for determining the air velocity of the ambient air in the environment of device 120 (e.g., in kilograms per second, etc.) and/or for determining the level of any suitable harmful gas or potentially harmful substance (e.g., VOC (e.g., any suitable harmful gasses, scents, odors, etc.) or particulate or dust or pollen or mold or the like) of the ambient air in the environment of device 120 (e.g., in HG % per liter, etc.) and/or for determining the humidity of the ambient air in the environment of device 100 (e.g., in grams of water per cubic meter, etc. (e.g., using a hygrometer)) and/or for determining the temperature of the ambient air in the environment of device 120 (e.g., in degrees Celsius, etc. (e.g., using a thermometer)). Sensor 15 may include any suitable sensor components or subassemblies for detecting any suitable characteristics of any suitable condition of the sound quality of the environment of device 120. For example, sensor 15 may include any suitable sound quality sensor that may include, but is not limited to, one or more microphones or the like that may determine the level of sound pollution or noise in the environment of device 120 (e.g., in decibels, etc.). Sensor 15 may also include any other suitable sensor for determining any other suitable characteristics about a user of device 120 and/or the environment of device 120 and/or any situation within which device 120 may be existing. For example, any suitable clock and/or position sensor(s) may be provided to determine the current time and/or time zone within which device 120 may be located. Sensor 15 may be embedded in a body (e.g., housing 11) of device 120, such as along a bottom surface that may be operative to contact a user, or can be positioned at any other desirable location. In some examples, different sensors can be placed in different locations inside or on the surfaces of device 120 (e.g., some located inside housing 11 and some attached to an attachment mechanism (e.g., a wrist band coupled to a housing of a wearable device), or the like). In other examples, one or more sensors can be worn by a user separately as different parts of a single device 120 or as different devices. In such cases, the sensors can be configured to communicate with device 120 using a wired and/or wireless technology (e.g., via communications component 14). In some examples, sensors can be configured to communicate with each other and/or share data collected from one or more sensors.

Power supply 17 can include any suitable circuitry for receiving and/or generating power, and for providing such power to one or more of the other components of device 120. For example, power supply assembly 17 can be coupled to a power grid (e.g., when device 120 is not acting as a portable device or when a battery of the device is being charged at an electrical outlet with power generated by an electrical power plant). As another example, power supply assembly 17 may be configured to generate power from a natural source (e.g., solar power using solar cells). As another example, power supply assembly 17 can include one or more batteries for providing power (e.g., when device 120 is acting as a portable device). Device 120 may also be provided with a housing 11 that may at least partially enclose one or more of the components of device 120 for protection from debris and other degrading forces external to device 120. Each component of device 120 may be included in the same housing 11 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, device 120 may include other components not combined or included in those shown or several instances of the components shown.

Processor 12 may be used to run one or more applications, such as an application 19 that may be accessible from memory 13 (e.g., as a portion of data 19d) and/or any other suitable source (e.g., from any other device in its system). Application 19 may include, but is not limited to, one or more operating system applications, firmware applications, communication applications (e.g., for enabling communication of data between devices), third party service applications, internet browsing applications (e.g., for interacting with a website provided by a third party subsystem (e.g., a device 102 with a source 112)), application programming interfaces ("APIs"), software development kits ("SDKs"), tracking system applications (e.g., a web application or a native application for enabling a device 102/104 to interact with an online service or server(s) 100 and/or the like), any other suitable applications, and/or the like. For example, processor 12 may load an application 19 as an interface program to determine how instructions or data received via an input component of I/O component 16 or other component of device 120 (e.g., sensor 15 and/or communications component 14) may manipulate the way in which information may be stored (e.g., in memory 13) and/or provided to via an output component of I/O component 16 and/or to another system device via communications component 14. As one example, application 19 may be a third party application that may be running on device 120 (e.g., an application associated with the network of system 1 (e.g., server 100) and/or data source 112) that may be loaded on device 120 (e.g., using communications component 14) via an application market, such as the Apple App Store or Google Play, or that may be accessed via an internet application or web browser (e.g., by Apple Safari or Google Chrome) that may be running on device 120 and that may be pointed to a uniform resource locator ("URL") whose target or web resource may be managed by or otherwise affiliated with any suitable entity. Any device (e.g., any user device or tracking device or server) may include any suitable special purpose hardware (e.g., hardware support of high-speed packet processing, hardware support of machine learning algorithms, etc.). For example, an out of range ("OOR") algorithm or OOR process of a tracking application may be executed on a user device with respect to a decoupled tracking device (e.g., a mobile application with an OOR algorithm running on user device 102 in response to a decoupling of tracking device 106 from user device 102 being detected).

Device 120 may be any portable, mobile, wearable, implantable, or hand-held electronic device configured to operate with system 1. Alternatively, device 120 may not be portable during use, but may instead be generally stationary. Device 120 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), a tag, credit card-shaped device (e.g., a shape designed to fit in spaces designed to hold a conventional credit card (e.g., a wallet compartment)), coin-shaped device, keychain-shaped device, money clip-shaped device, ornament-shaped device, ball-shaped device, tube-shaped device, sticker-shaped device, transponder, transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device, boom box, modem, router, printer, kiosk, beacon, server, and any combinations thereof that may be useful as a user device or tracking device or system server or data source.

One or more tracking algorithms or processes may be provided for determining when to alert a user of a user device that a tracking device once communicatively coupled to the user device is now out of range or lost. For example, system 1 may be configured such that a user device, alone or in any suitable combination with a tracking system server and/or any other user device, may utilize an out of range ("OOR") algorithm whenever a tracking device is determined to be communicatively decoupled from the user device, where the OOR algorithm may be configured to trigger an OOR alert with the user device when the OOR algorithm determines that a confidence level threshold has been satisfied with respect to the tracking device being out of range of the user device (e.g., to notify a user of the user device that the tracking device has been left behind or lost).

Figure 1B:
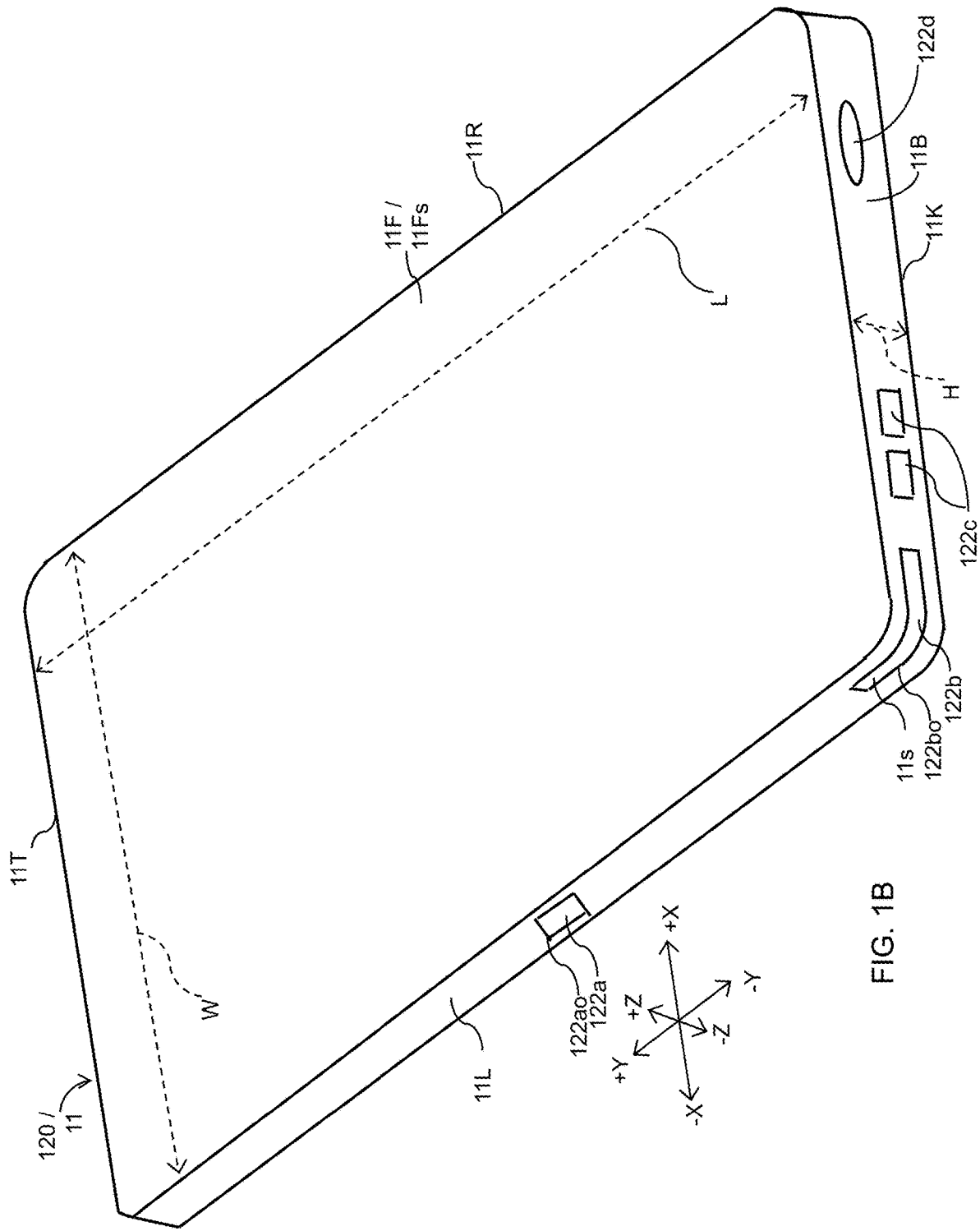
FIG. 1B is a bottom, front, left side perspective view of a system device, according to some embodiments of the disclosure.
Figure 2:
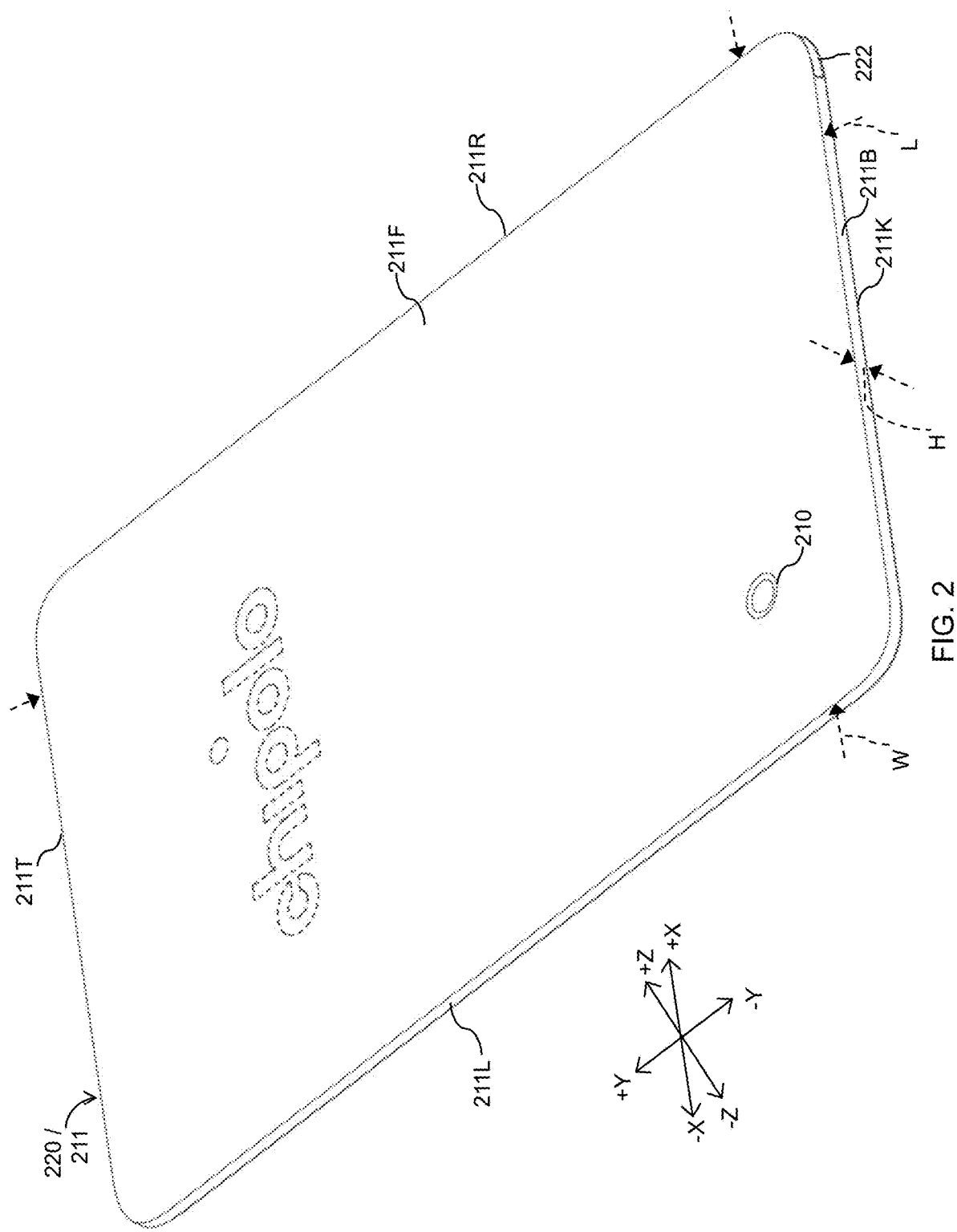
FIG. 2 is a bottom, front, left side perspective view of an electronic tracking device, according to some embodiments of the disclosure.
Figure 2A:
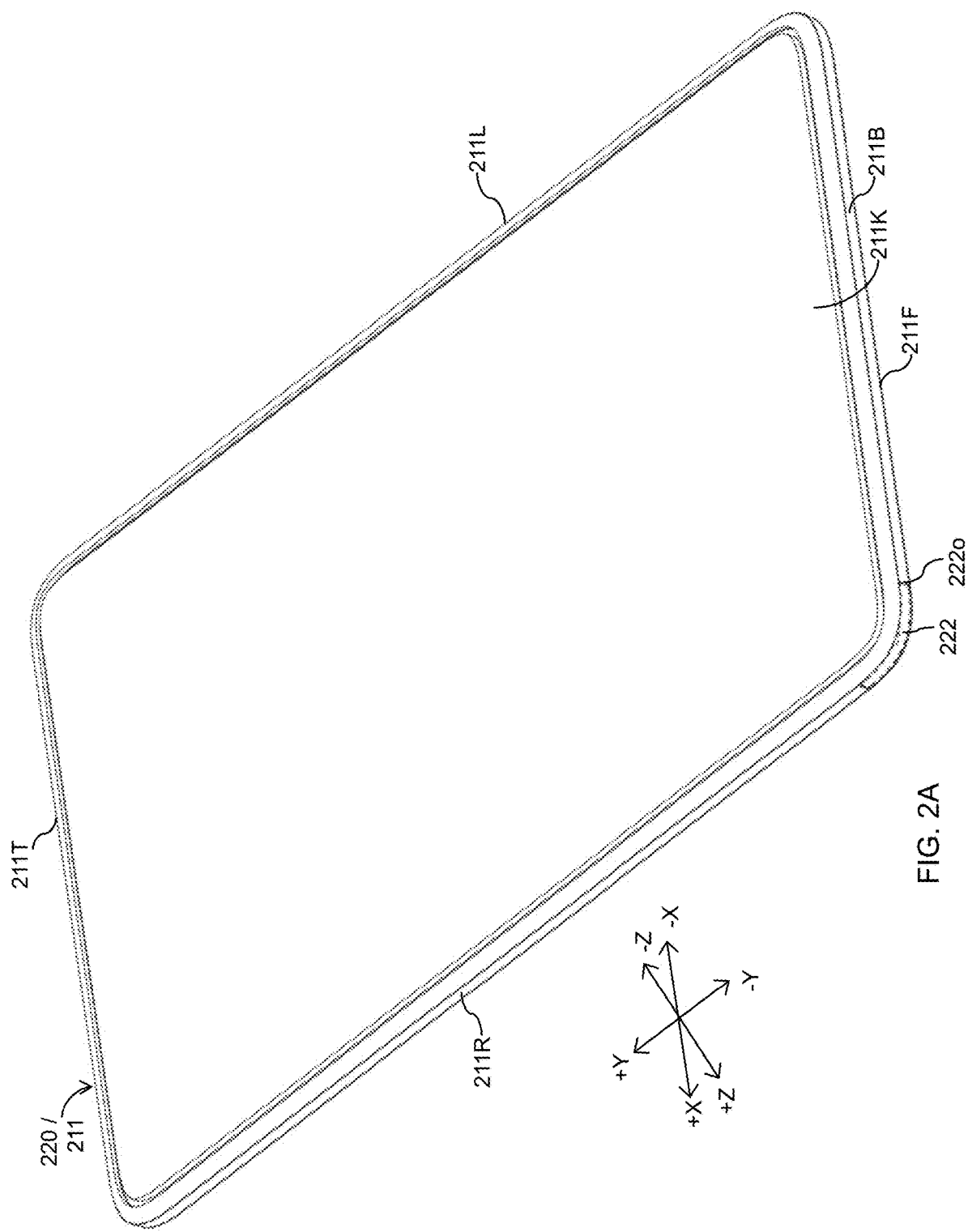
FIG. 2A is a bottom, rear, right side perspective view of the device of FIG. 2, according to some embodiments of the disclosure.
Figure 2B:
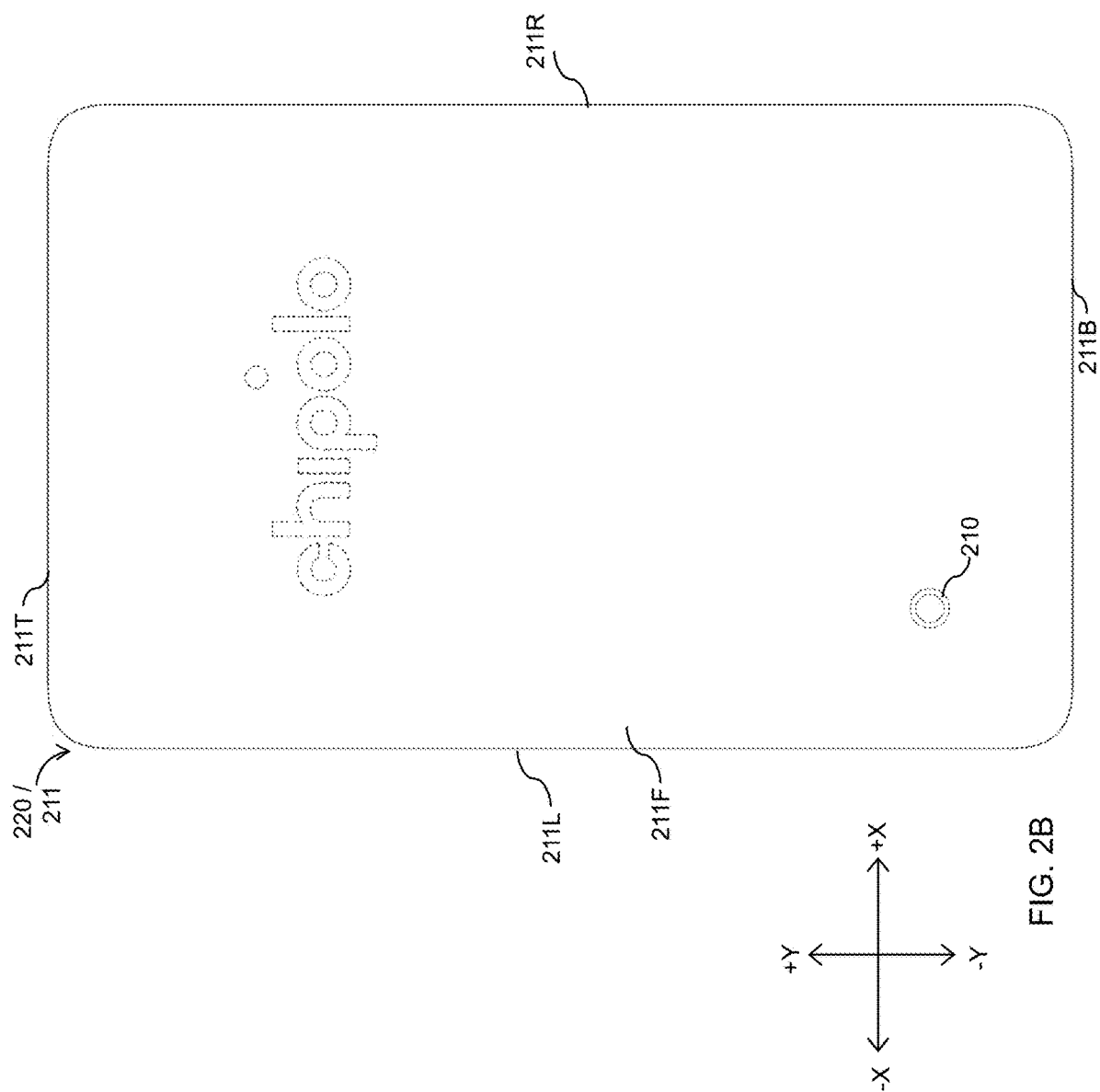
FIG. 2B is a front view of the device of FIGS. 2 and 2A, according to some embodiments of the disclosure.
Figure 2D:
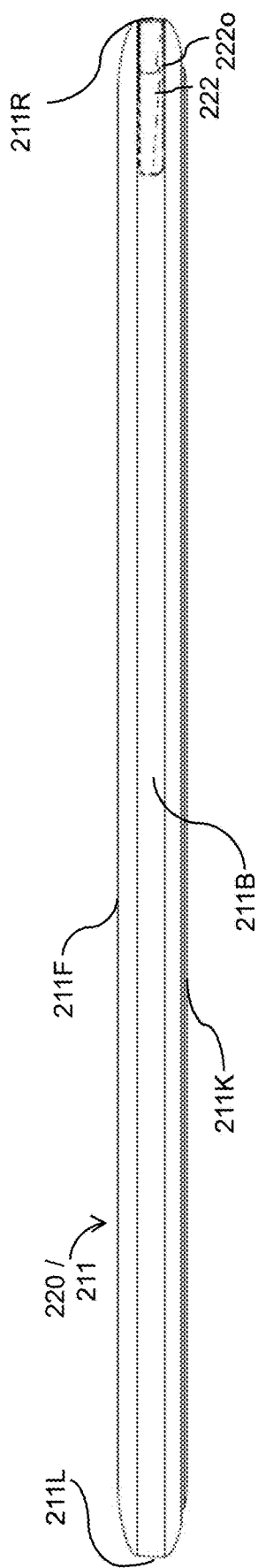
FIG. 2D is a bottom view of the device of FIGS. 2 and 2A-2C, according to some embodiments of the disclosure.
Figure 2D:
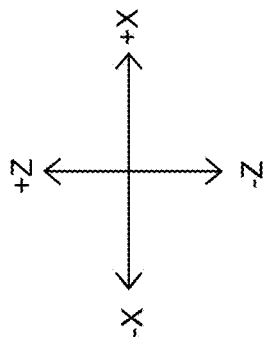
Figure 2E:
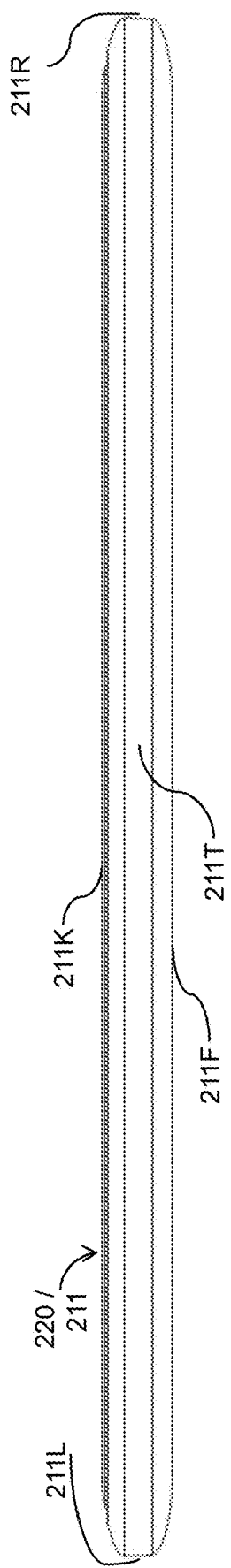
FIG. 2E is a top view of the device of FIGS. 2 and 2A-2D, according to some embodiments of the disclosure.
Figure 2E:
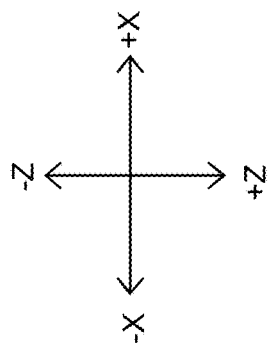
Figure 2F:
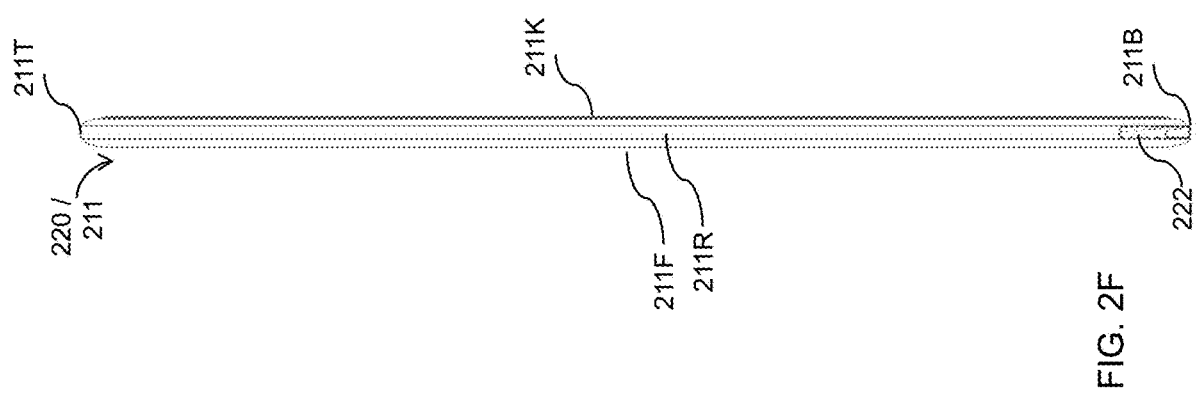
FIG. 2F is a right side view of the device of FIGS. 2 and 2A-2E, according to some embodiments of the disclosure.
Figure 2F:
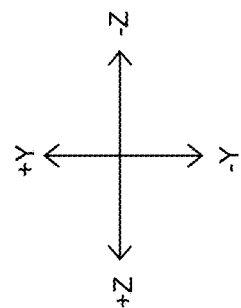
Figure 2G:
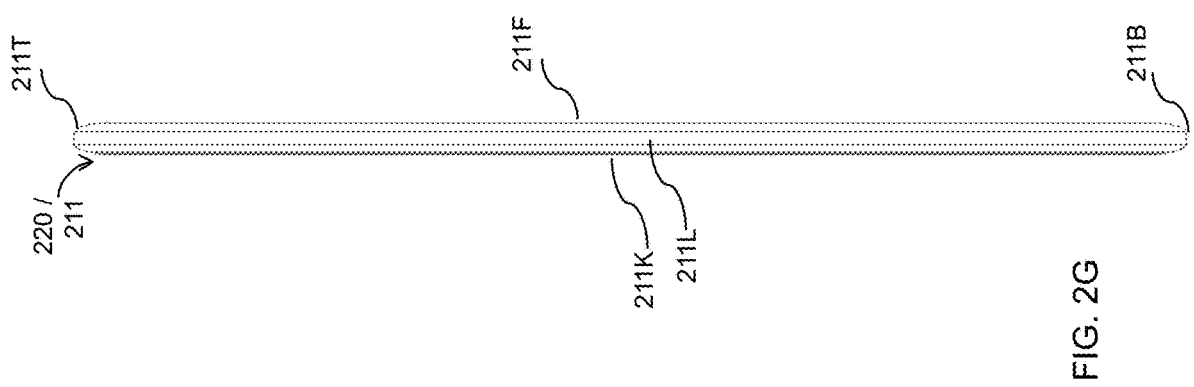
FIG. 2G is a left side view of the device of FIGS. 2 and 2A-2F, according to some embodiments of the disclosure.
Figure 2G:
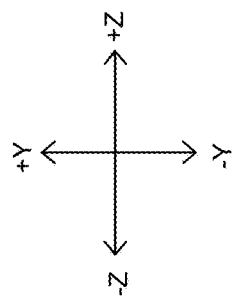
Figure 3:
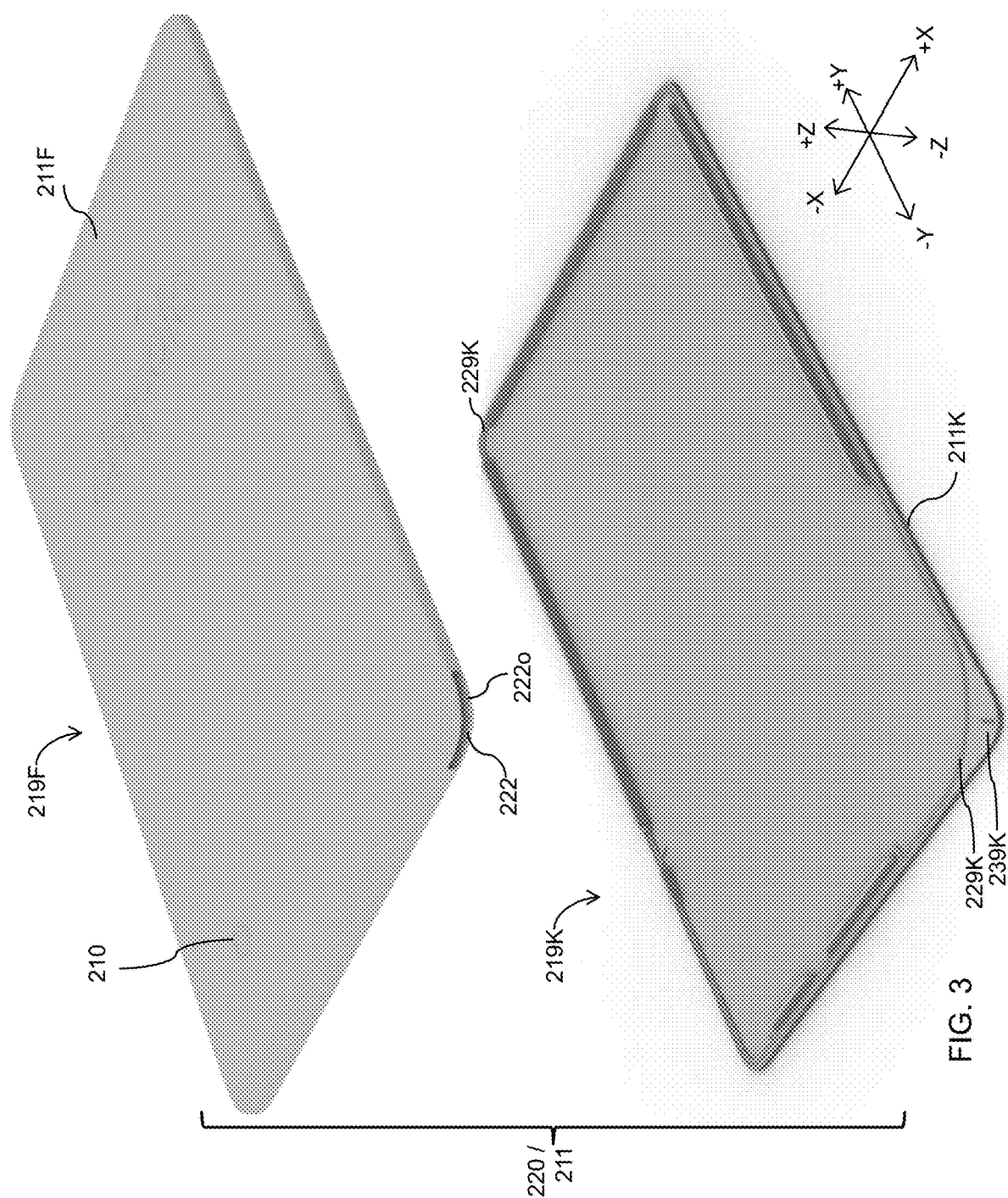
FIG. 3 is a bottom, front, right side perspective view of multiple housing portions of the device of FIGS. 2 and 2A-2F in an earlier state of manufacture, according to some embodiments of the disclosure.
Figure 3C:
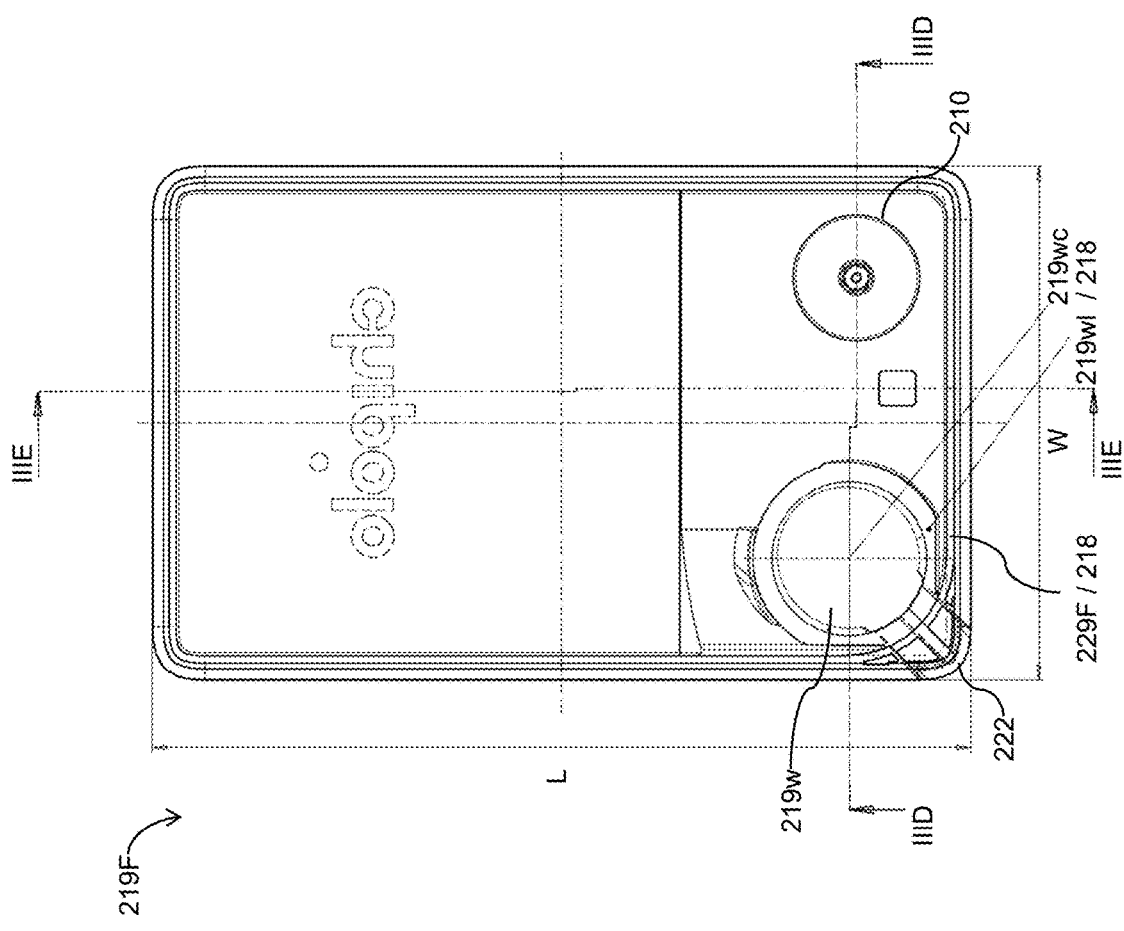
FIG. 3C is a rear view of the housing portion of the device of FIGS. 2 and 2A-2F and 3 and 3A-3B, according to some embodiments of the disclosure.
Figure 3D:
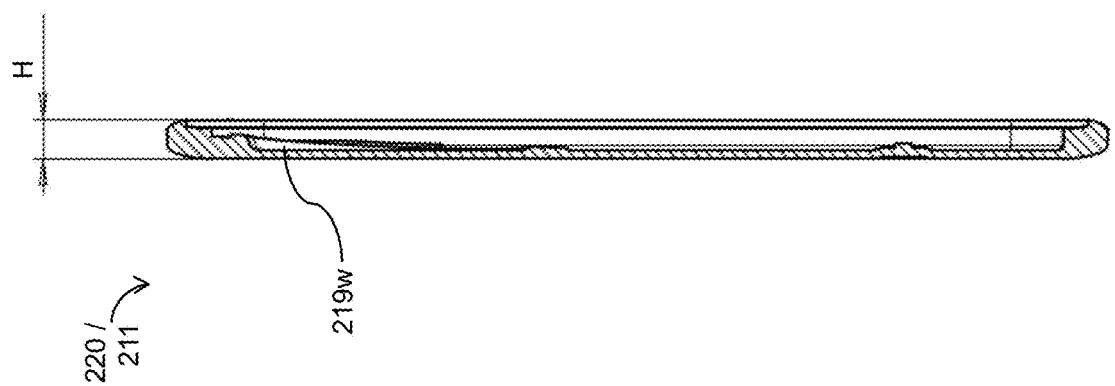
FIG. 3D is a cross-section view of the housing portion of the device of FIGS. 2 and 2A-2F and 3 and 3A-3C, taken from line IIID-IIID of FIG. 3C, according to some embodiments of the disclosure.

As shown in FIG. 1B, electronic device 120 (e.g., a tracking device) may be provided as any suitable apparatus that may include a housing 11 defining at least one internal space 11s that may be configured to at least partially hold, protect (e.g., from water, debris, etc.), and/or carry any suitable components (e.g., battery, audio speaker, input component, communications component, processor, and/or the like). Housing 11 may be any suitable shape and may include any suitable number of walls. In some embodiments, as shown in FIG. 1B, for example, housing 11 may be of a generally hexahedral shape and may include a bottom wall 11B, a top wall 11T that may be opposite bottom wall 11B, a left wall 11L, a right wall 11R that may be opposite left wall 11L, a front wall 11F, and a rear or back wall 11K that may be opposite front wall 11F. As shown, for example, a size of device 120 may be defined along the X-axis by an overall housing width W of housing 11 that may extend between left surface 11L and right surface 11R, along the Y-axis by an overall housing length L of housing 11 that may extend between top surface 11T and bottom surface 11B, and along the Z-axis by an overall housing depth or height H of housing 11 that may extend between front surface 11F and back surface 11K. Internal space 11s may be accessed in any suitable manner, such as through an opening or passageway provided through the housing as a portion of an I/O component or when two housing portions of the housing are at least partially decoupled. Although surfaces (e.g., exterior surfaces, such as exterior surface 11Fs) of various walls of housing 11 may be shown as substantially rectangular and flat, it is to be understood that any wall or surface or edge or corner may be any suitable shape (e.g., may be defined by a curved or other non-polygonal (e.g., circular) shape), and/or any two walls may meet at any suitable angle and/or form an edge of any suitable shape or curvature. As mentioned, device 120 may be any suitable apparatus, including, but not limited to, a server, laptop, portable media device, electronic tracking device (e.g., in a credit card form, keychain form, etc.), and/or the like, and housing 11 may be made of any suitable material and/or combination of materials, including, but not limited to, plastic, metal, metal alloys, wood-derivatives, carbon fiber, and/or the like. Although not shown, device 120 may include any suitable accessories on, about, or coupled to housing 11, including a case and/or case components, handle(s), strap(s), pocket(s), loop(s), hole(s) (e.g., for a key chain ring), and/or any other suitable features.

Any suitable passageway(s) (e.g., passageway(s) 122) may be provided through housing 11 for providing or enabling at least a portion of any suitable I/O component or sensor component or otherwise that may be at least partially positioned within internal housing space 11s by communicatively coupling a portion of such component within space 11s with the environment external to housing 11 (e.g., for passing sound waves therebetween). Any passageway for communicatively coupling the environment external to housing 11 with an internal component within housing space 11s may be of any suitable shape(s) and size(s) and may be provided through any suitable portion(s) of housing 11 and/or between any suitable portion(s) of housing 11 and may present any suitable shape(s) and size(s) through one or more external surface(s) of any suitable wall(s) of housing 11. For example, one or more passageways may be provided through one or more walls that may be limited in a direction by height H, such as a passageway 122a that may be provided through left wall 11L (e.g., through a rectangular opening 122ao at the external surface of wall 11L) for enabling communication between the external environment and a first internal component, a passageway 122b that may be provided through a portion of left wall 11L and a portion of bottom wall 11B along/about the edge or corner(s) extending therebetween (e.g., through any suitable shaped opening 122*bo* at the external surface(s) of wall 11L and/or wall 11B) for enabling communication between the external environment and a second internal component, two passageway portions 122*c* that may be provided through bottom wall 11B (e.g., each through a rectangular opening at the external surface of wall 11B) for enabling communication between the external environment and a third internal component, and a passageway 122*d* that may be provided through bottom wall 11B (e.g., with a circular or oval opening at the external surface of wall 11B) for enabling communication between the external environment and a fourth internal component.

Device 120 and its housing 11 may be any suitable form factor for any suitable purpose. For example, device 120 may be an electronic tracking device configured with a geometry similar to a credit card or a coin for safe and secure transport in a wallet. In such embodiments, as shown in FIGS. 2 and 2A-2G by an exemplary housing 211 of an exemplary electronic device 220 that may be similar to device 120, length L may be about 85.60 millimeters (e.g., ±10 millimeters), width W may be about 53.98 millimeters (e.g., ±10 millimeters), while height H may be about 0.76 millimeters (e.g., ±10 millimeters) (e.g., for a standard "CR80" or "credit card size"), although any other suitable dimensions (e.g., spatial dimensions) may be possible, such as a height H in a range of between 0.50 millimeters to 5 millimeters, or 3.00 millimeters to 5.00 millimeters, or 2.00 millimeters to 3.00 millimeters, or 2.45 millimeters, or the like. As shown, for example, housing 211 may include a bottom wall 211B, a top wall 211T that may be opposite bottom wall 211B, a left wall 211L, a right wall 211R that may be opposite left wall 211L, a front wall 211F, and a rear or back wall 211K that may be opposite front wall 211F. Height H may extend between front surface 211F and back surface 211K. Width W may extend between left wall 211L and right wall 211R. Length L may extend between top wall 211T and bottom wall 211B. Any passageway for communicatively coupling the environment external to housing 211 with an internal component at least partially within a housing space 211*s* may be of any suitable shape(s) and size(s) and may be provided through any suitable portion(s) of housing 211 and/or between any suitable portion(s) of housing 211 and may present any suitable shape(s) and size(s) through one or more external surface(s) of any suitable wall(s) of housing 211. For example, one or more passageways may be provided through one or more walls limited in a direction by height H, such as a passageway 222 that may be provided through a portion of right wall 211R and a portion of bottom wall 211B along/about the edge or corner(s) extending therebetween (e.g., through any suitably sized and shaped opening 2220 at the external surface(s) of wall 211R and/or wall 211B) for enabling communication between the external environment and an internal component. In some embodiments, as shown, an interface 210 for any suitable component (e.g., a push button) may be provided at front wall 211F.

As shown in FIGS. 3 and 3A-3E, housing 211 may be formed by a single unitary structure or may be a housing assembly that may be formed by two or more housing portions or housing components, such as a first or front housing portion 219F, which may include at least a portion of front wall 211F, and a second or rear or back housing portion 219K, which may include at least a portion of back wall 211K. The housing portions may be coupled together to form housing 211 for use by an end user. Prior to coupling together the housing components (e.g., along the Z-axis), one or more internal components may be positioned between the housing components or coupled to one of the housing components, such that the internal components may be at least partially positioned within internal housing space 211*s* when the housing components are coupled together. Additional dimensions may be shown in FIG. 3E, including a dimension K, which may be 0.35 millimeters (e.g., ±0.05 millimeters) or any other suitable dimension (e.g., 0.05 millimeters to 1.00 millimeters), a dimension M, which may be 0.05 millimeters (e.g., ±0.01 millimeters) or any other suitable dimension that may be the depth of a logo into an exterior wall surface (e.g., "chipolo" in front wall 211F) (e.g., 0.05 millimeters to thickness of material less 0.05 millimeters), a dimension N, which may be 0.45 millimeters (e.g., ±0.05 millimeters) or any other suitable dimension that may be a thickness of a wall (e.g., front wall 211F) (e.g., 0.05 millimeters to 1.00 millimeters), a dimension O, which may be 1.25 millimeters (e.g., ±0.05 millimeters) or any other suitable dimension that may be the height of internal housing space 211*s* when the housing components are coupled together (e.g., 0.75 millimeters to 5.00 millimeters or perhaps even up to 10.00 millimeters), and/or the like. While, in some embodiments, height H may extend between front surface 211F and back surface 211K. In some other embodiments, back housing portion 219K may be coupled to front housing portion 219F such that a maximum height of device 220 may be determined by front housing portion 219F alone rather than a maximum height of device 220 extending from a wall of front housing portion 219F to a wall of back housing portion 219K.

As shown in FIGS. 4 and 4A-4E, housing 211 may include any suitable features for enabling one or more passageways, such as passageway 222, therethrough, including through a housing wall that may be limited by a height H. The passageway may be operative to communicatively couple (e.g., fluidly couple (e.g., allow sound waves to travel through fluids (e.g., water or air between))) any suitable internal component of the device within space 211*s*, such as internal component or communication component 216 (e.g., any suitable output component (e.g., a piezoelectric speaker or a membrane speaker or any other suitable audio output component and/or transceiver), any suitable input component (e.g., microphone, sensor, etc.), and/or any other suitable device (e.g., I/O) and/or transceiver) component), with the environment external to the housing (e.g., for enabling sound waves to travel therebetween via the passageway). Component 216 may be positioned at least partially within a component space or well 219*w* (e.g., a circular shaped dish (e.g., with a center 219*wc* at its bottom) or other suitable concave receptacle (e.g., with a variable depth 219*wd*) or other geometry provided by housing component 219F and coupled thereto (e.g., to portions of well ledge 219*wl* that may define an upper outer rim of well 219*w* (e.g., with variable depth 219*wd* extending from ledge 219*wl*)) in any suitable manner (e.g., via a glue or other suitable adhesive (e.g., along any suitable front surface 216F of component 216 and/or along any suitable side surface(s) 216S of component 216)). Well 219*w* may define a portion of space 211*s* (e.g., a sound cavity 219*c* (e.g., when component 216 is coupled to ledge 219*wl* of well 219*w* (e.g., thereby forming an angle α with an inner surface 211Fi of front wall 211F (see, e.g., FIG. 5C), where such an angle α (e.g., as may be defined by the variance of depth 219*wd* of well 219*w*) may be varied (e.g., between 1° and 90°) based on any suitable desired characteristic(s) of the performance of passageway 222 and component 216 (e.g., acoustic response and/or amplification and/or the like)))). A sidewall 219*ws* of well 219*w* may extend away from ledge 219*wl* and at least a portion of sidewall 219ws may have a similar contour, shape, and/or geometry as an outer surface of component 216 such that the two surfaces may be easily and more effectively coupled to each other (e.g., to promote a watertight seal). Any suitable signal source 216ss (e.g., a processor any other suitable component of device 220) may be positioned withing space 211s (e.g., in space 211bs) and may be electrically coupled to component 216 for exciting component 216 to produce sound.

As shown in FIGS. 5 and 5A-5C, housing 211 of device 220 may include any suitable features for enabling one or more passageways, such as passageway 222, therethrough, including through a housing wall that may be limited by a height H. Additional dimensions may be shown in FIG. 5A, including a dimension PA, which may be 3.05 millimeters (e.g., ±0.50 millimeters) or any other suitable dimension that may be a cross-sectional dimension of a passageway portion 232A of passageway 222, a dimension PB, which may be 3.05 millimeters (e.g., ±0.50 millimeters) or any other suitable dimension that may be a cross-sectional dimension of a passageway portion 232B of passageway 222, a dimension Q, which may be 1.00 millimeters (e.g., ±0.25 millimeters) or any other suitable dimension that may be a cross-sectional dimension of a spacer support between adjacent passageway portions 232A and 232B (e.g., exhausts) of passageway 222, a dimension RA, which may be 0.60 millimeters (e.g., ±0.15 millimeters) or any other suitable dimension that may be a cross-sectional dimension (e.g., height) of passageway portion 232A of passageway 222, a dimension RB, which may be 0.60 millimeters (e.g., ±0.15 millimeters) or any other suitable dimension that may be a cross-sectional dimension (e.g., height) of passageway portion 232B of passageway 222, and/or the like. In some embodiments, a cross-section of a passageway portion may be of any suitable size, such as 1.5 millimeters by 1.5 millimeters (e.g., each one of dimensions PA, PB, RA, and RB may be 1.5 millimeters or 1.75 millimeters or 1.732 millimeters) or any other suitable geometry (e.g., for enabling a certain sound frequency between component 216 and the device's external environment). Each passageway portion may be considered a sound emitting hole or exhaust. Back housing portion 219K may be coupled to front housing portion 219F (e.g., a front-facing ledge 229K of back housing portion 219K may be coupled to a rear-facing ledge 229F of front housing portion 219F) using any suitable methodology, including, but not limited to, ultrasonic welding, or the like, which may form a watertight seal between the housing portions for waterproofing internal space 211s from water or other debris that may otherwise try to pass between the housing portions and into space 211s other than through passageway 222. The coupling (e.g., glue) between one or more surfaces of component 216 and one or more surfaces of well 219w of housing component 219F (e.g., between front surface 216F of component 216 and well ledge 219wl of housing component 219F) may be configured to be watertight (e.g., certified for water resistance (e.g., IPX7)), such that the coupling between component 216 and housing component 219F (e.g., sidewall 219ws) in conjunction with the coupling between housing components 219F and 219K may combine to provide a watertight seal between component 216 and passageway 222 that may prevent any water or other suitable external environment fluids from traveling into space 211s between housing components 219F and 219K other than into passageway 222 and well 219w and an appropriate portion of internal component 216. A communication component coupling interface 218 (e.g., a circular interface) between one or more surfaces of component 216 and one or more surfaces of well 219w of housing component 219F (e.g., between front surface 216F and well ledge 219wl) may be within (e.g., surrounded by or contained by) a housing component coupling interface 221 (e.g., a substantially rectangular with curved corners interface) between housing components 219F and 219K (e.g., between ledges 229F and 229K).

Figure 4:
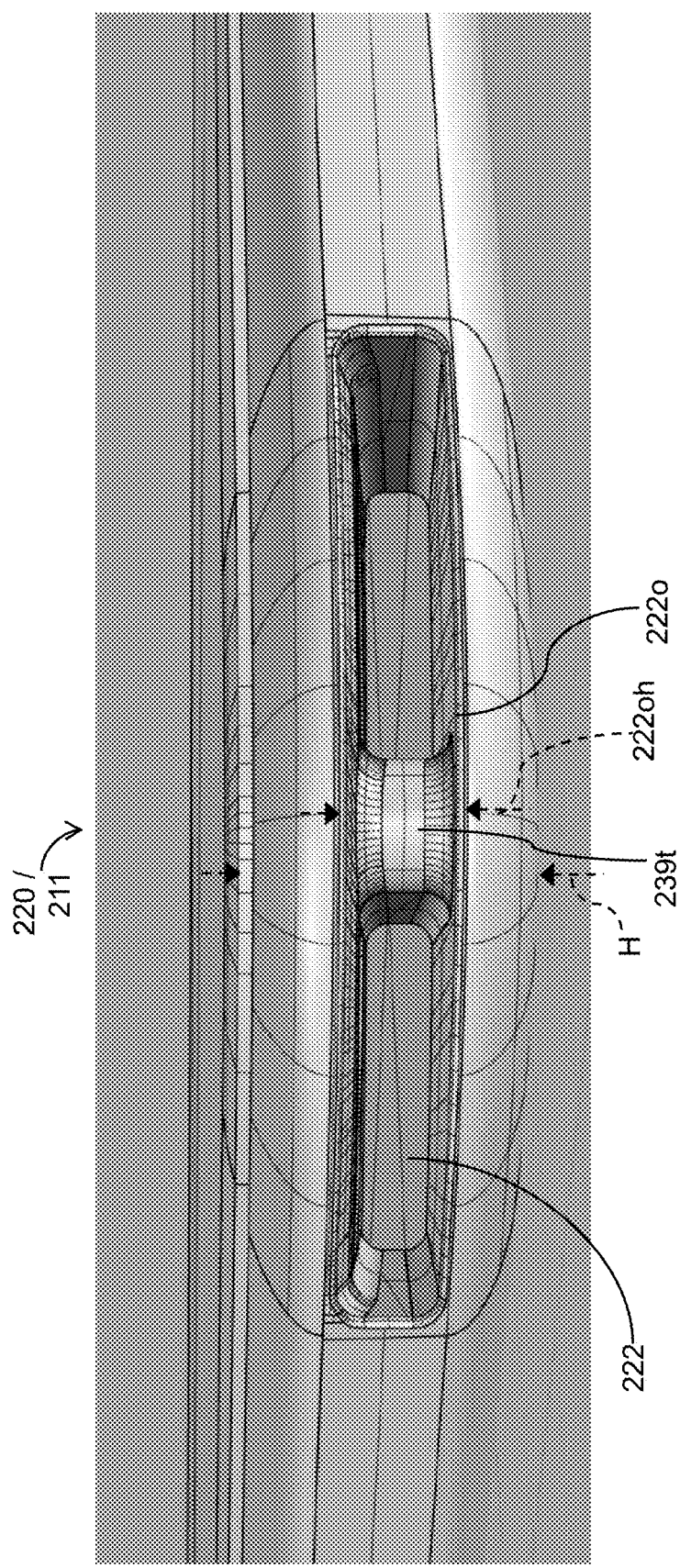
FIG. 4 is a bottom, right side view of the device of FIGS. 2 and 2A-2F and 3 and 3A-3E, according to some embodiments of the disclosure.
Figure 4A:
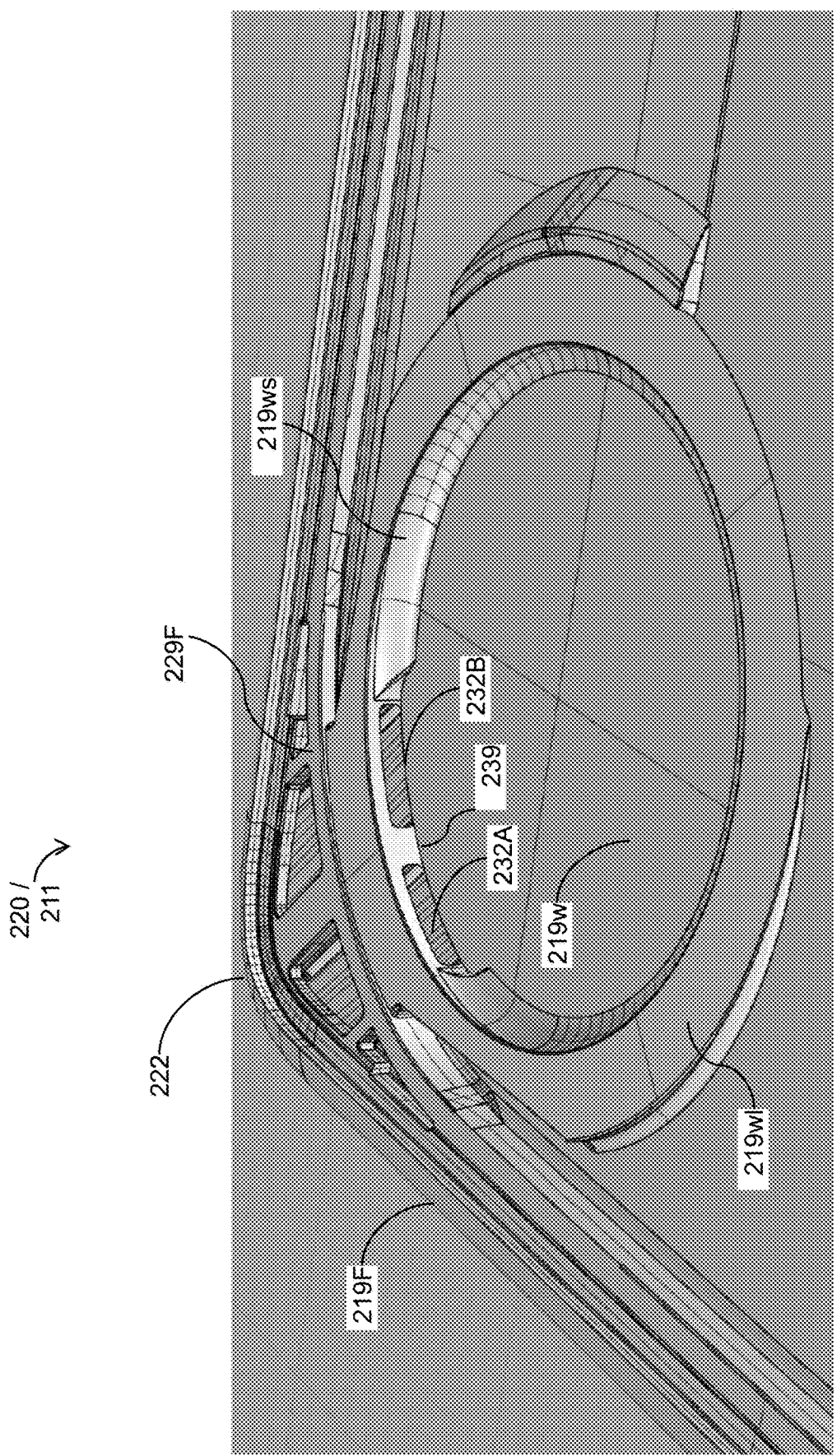
FIG. 4A is a top, rear, left side perspective view of a portion of a housing portion of the device of FIGS. 2 and 2A-2F and 3 and 3A-3D and 4, according to some embodiments of the disclosure.
Figure 4B:
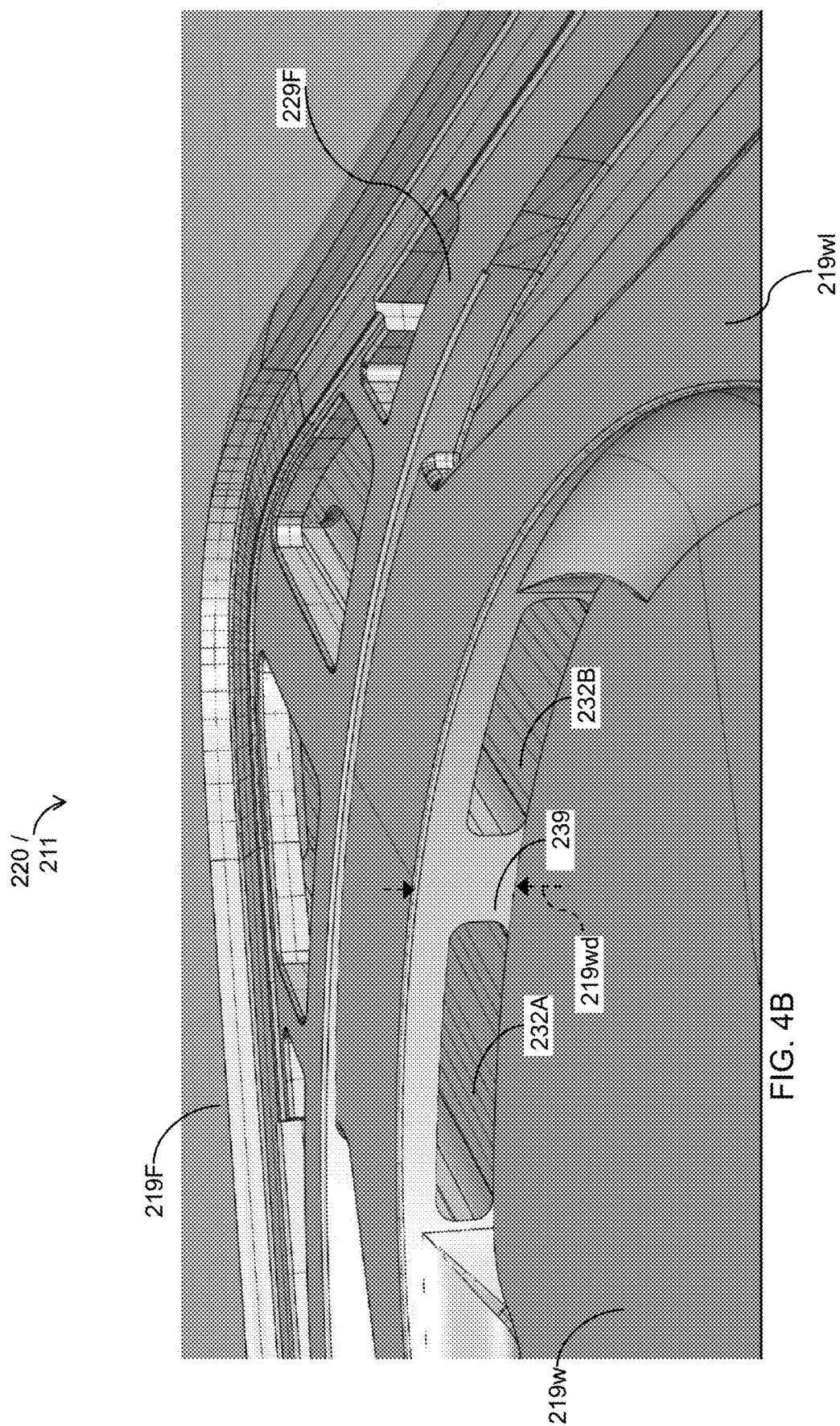
FIG. 4B is a top, rear, left side perspective view of a portion of a housing portion of the device of FIGS. 2 and 2A-2F and 3 and 3A-3D and 4 and 4A, according to some embodiments of the disclosure.
Figure 4C:
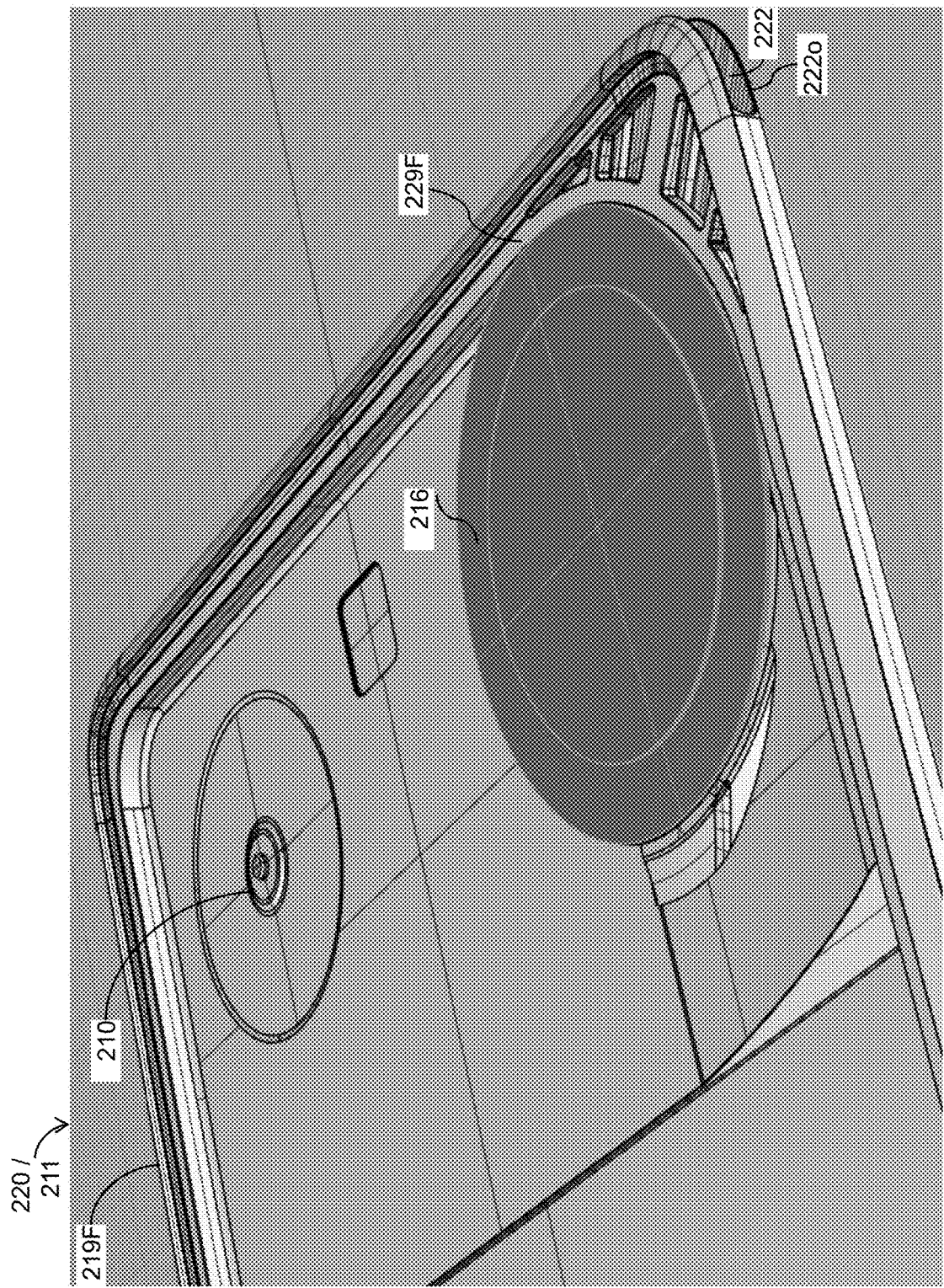
FIG. 4C is a top, rear, right side perspective view of a portion of a housing portion of the device of FIGS. 2 and 2A-2F and 3 and 3A-3D and 4 and 4A and 4B along with an internal component, according to some embodiments of the disclosure.
Figure 4D:
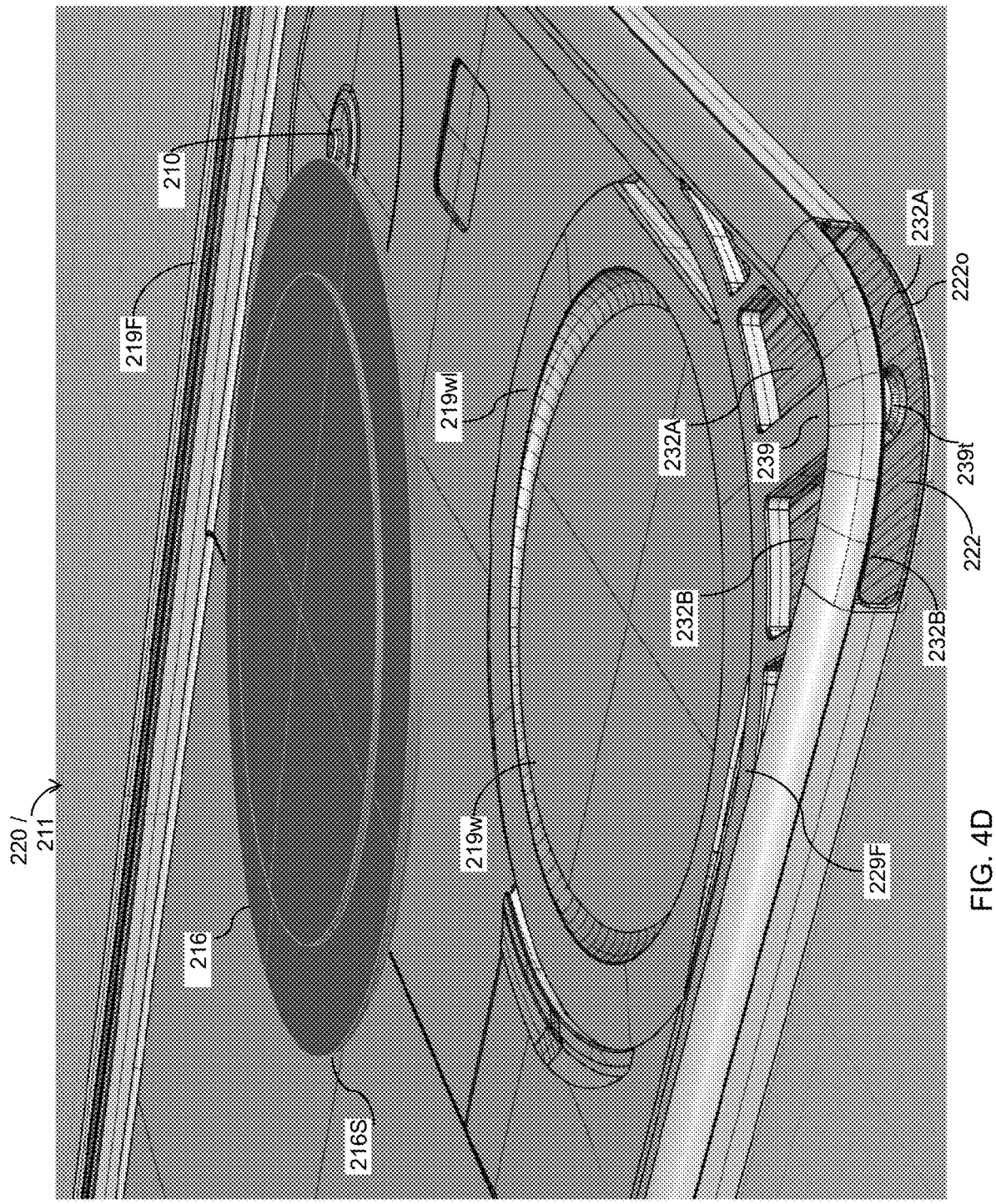
FIG. 4D is a bottom, rear, right side perspective view of a portion of a housing portion of the device of FIGS. 2 and 2A-2F and 3 and 3A-3D and 4 and 4A-4C along with the internal component of FIG. 4C, according to some embodiments of the disclosure.
Figure 4E:
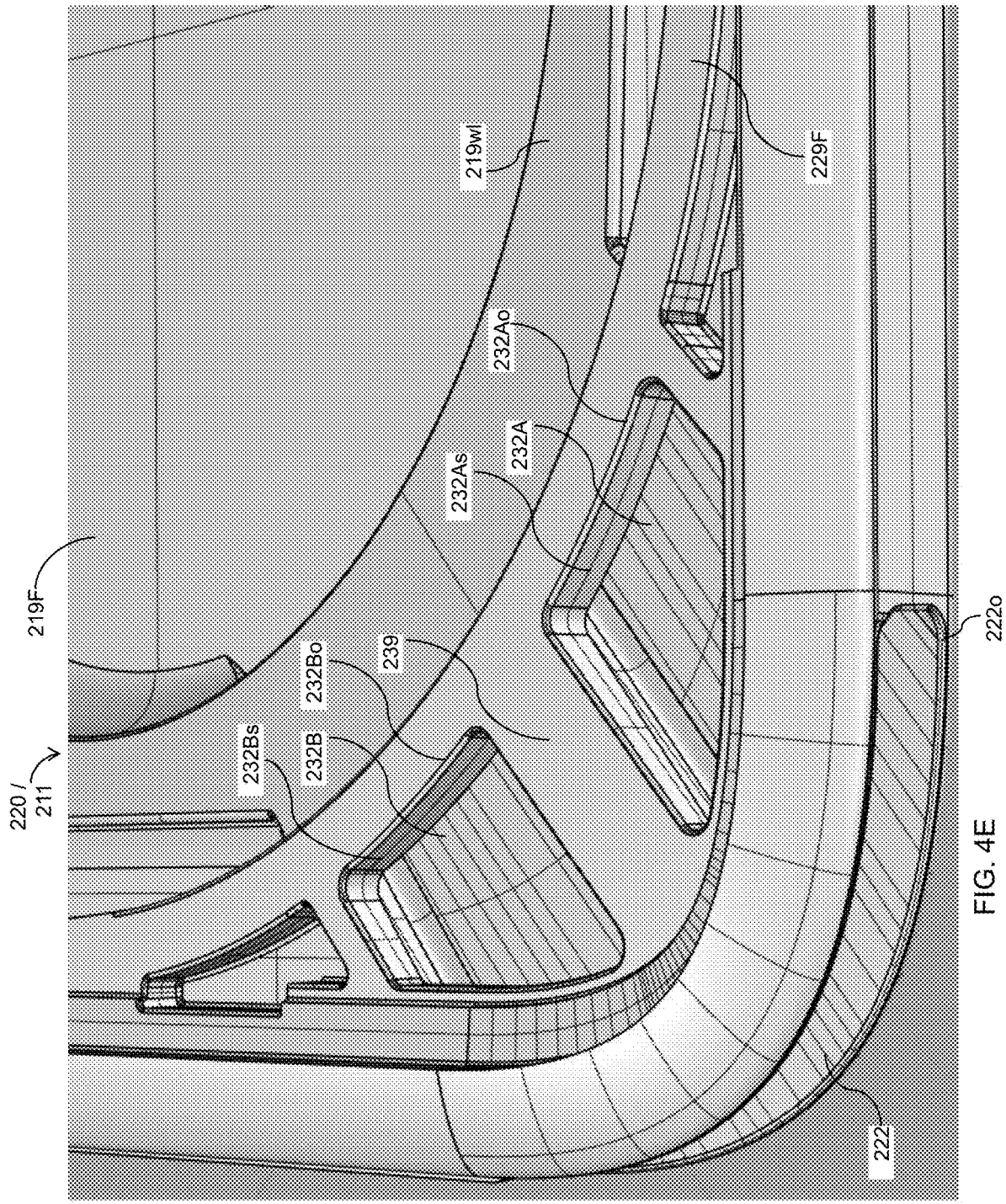
FIG. 4E is a rear, right side view of a portion of a housing portion of the device of FIGS. 2 and 2A-2F and 3 and 3A-3D and 4 and 4A-4D, according to some embodiments of the disclosure.
Figure 5:
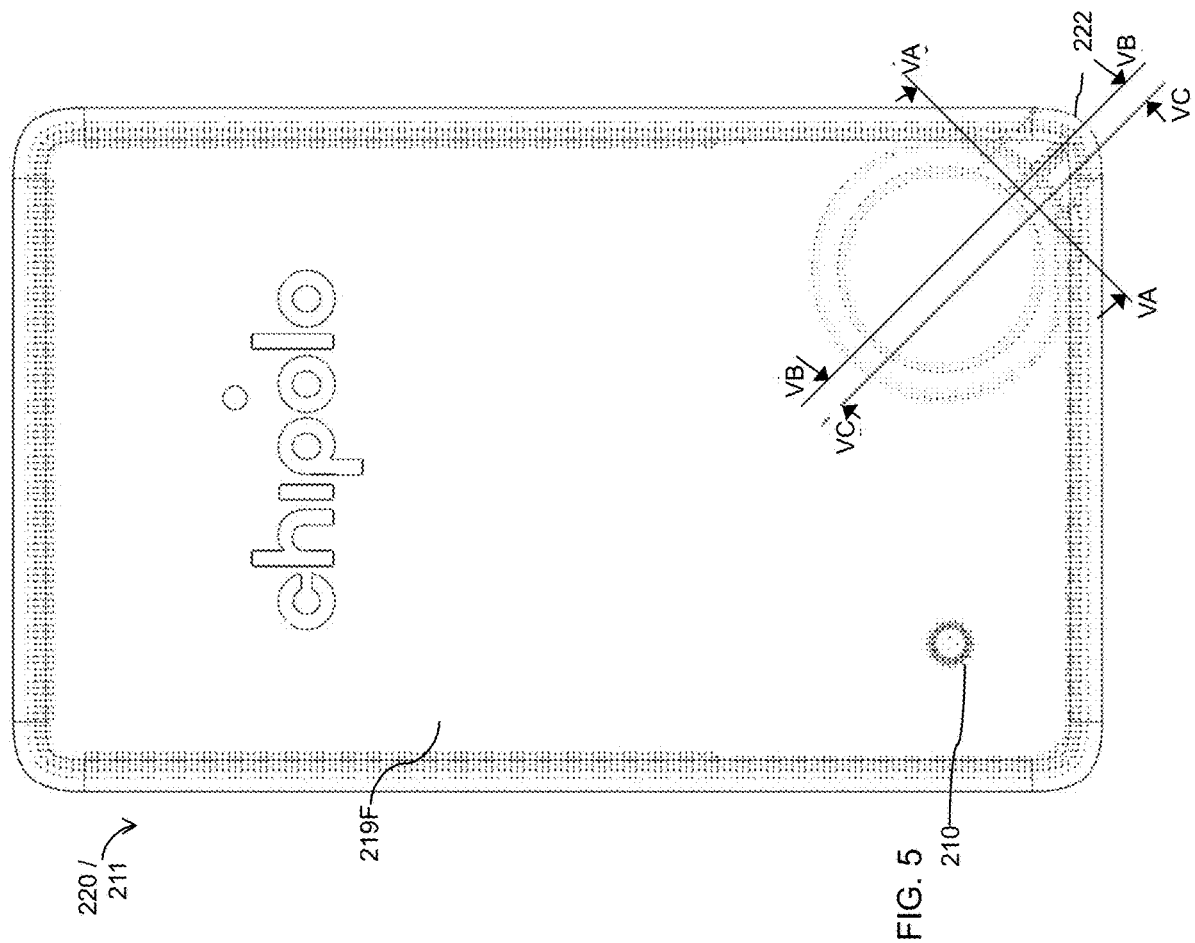
FIG. 5 is a front view of the device of FIGS. 2 and 2A-2F and 3 and 3A-3E and 4 and 4A-4E, according to some embodiments of the disclosure.
Figure 5A:
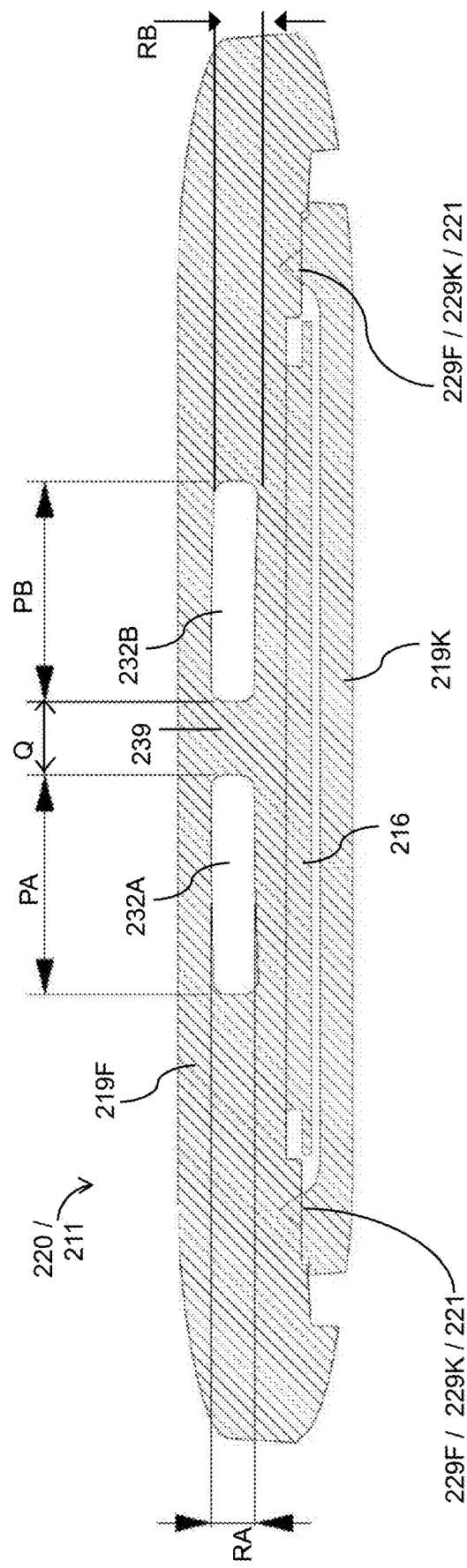
FIG. 5A is a cross-section view of the device of FIGS. 2 and 2A-2F and 3 and 3A-3E and 4 and 4A-4E and 5, taken from line VA-VA of FIG. 5 according to some embodiments of the disclosure.
Figure 5B:
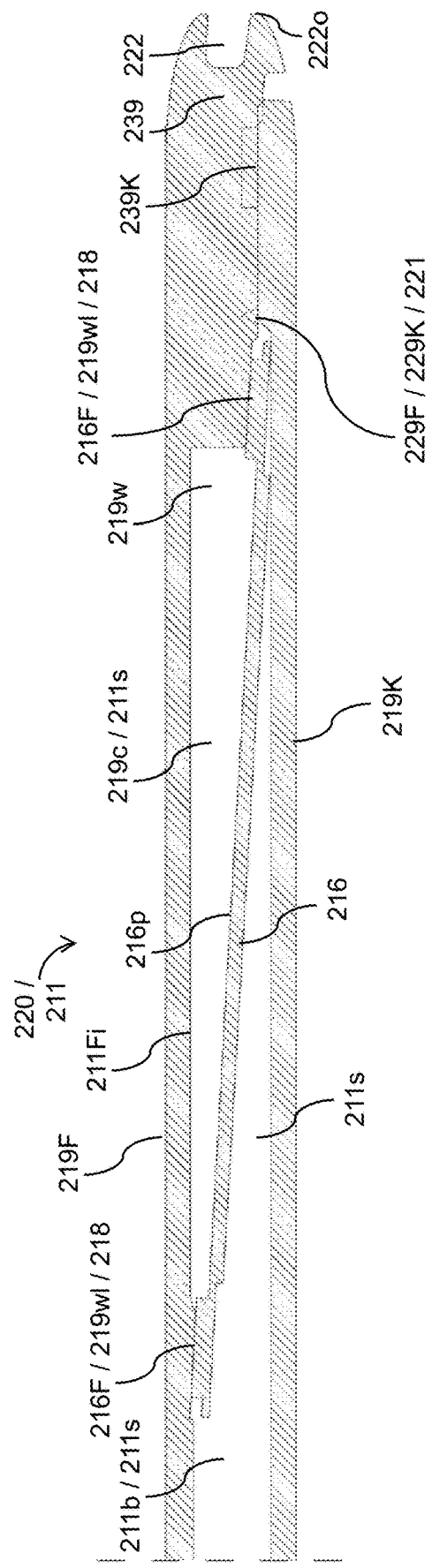
FIG. 5B is a cross-section view of the device of FIGS. 2 and 2A-2F and 3 and 3A-3E and 4 and 4A-4E and 5 and 5A, taken from line VB-VB of FIG. 5 according to some embodiments of the disclosure.
Figure 5C:
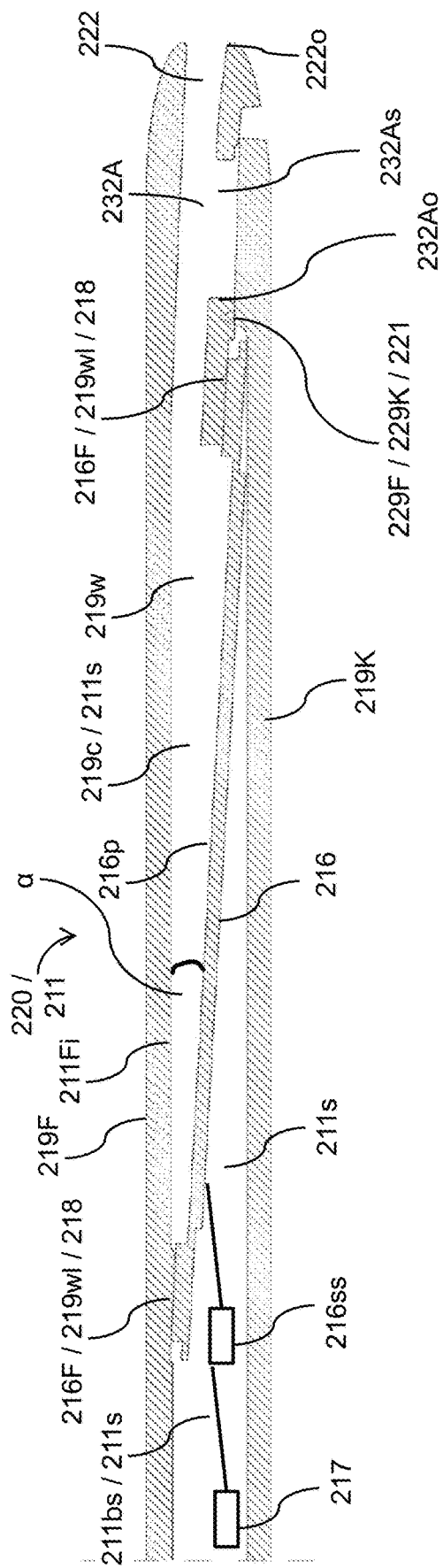
FIG. 5C is a cross-section view of the device of FIGS. 2 and 2A-2F and 3 and 3A-3E and 4 and 4A-4E and 5 and 5A and 5B, taken from line VC-VC of FIG. 5 according to some embodiments of the disclosure.

A spacer support 239 of front housing portion 219F and/or a space support 239K of back housing portion 219K may separate two passageway portions 232A and 232B of passageway 222 along at least a portion thereof between the exterior of the housing and an exterior of internal component 216, which may provide any suitable support or additional structure (e.g., structural integrity) to at least a portion of the housing (e.g., a portion of the housing at the bottom right corner that may be rounded and/or extending beyond the coupling region for the two housing components (e.g., beyond ledge 229F towards the exterior bottom right corner of the housing)) and/or may prevent certain objects (e.g., a screwdriver) from being dangerously inserted into the passageway. In some embodiments, as shown, spacer support(s) may not extend along the entire length of passageway 222 (e.g., not all the way to component 216 and/or not all the way to the external environment). A tip 239t of spacer support 239 may be rounded (e.g., as shown) or any other suitable shape and may extend all the way to the exterior of the housing or not all the way to the exterior of the housing such that passageway portions 232A and 232B may meet beyond tip 239t but between portions of the housing within passageway 222 (e.g., as shown). One or more spaces may be formed into a housing component (e.g., front housing component 211F) for any suitable reason (e.g., to aid in a molding or other suitable formation process), where one or more of such spaces may be communicatively coupled to passageway 222 and may provide an additional amplifying chamber or chambers that may be configured to promote a desired acoustic response or amplification for sound waves traveling via passageway 222 or otherwise affect the performance of passageway 222 and component 216 (e.g., space 232As via opening 232Ao extending between another portion of passageway 232A and a surface of front housing component 211F that may provide ledge 229F and/or space 232Bs via opening 232Bo extending between another portion of passageway 232B and a surface of front housing component 211F that may provide ledge 229F and/or the like). A wall of back housing portion 219K may block none, some, or all of opening 232Ao and/or opening 232Bo when back housing portion 219K is coupled to front housing component 211F (e.g., all as shown in FIG. 5C), where such blocking coverage may be varied based on any suitable desired characteristic(s) of the performance of passageway 222 and component 216 (e.g., acoustic response and/or amplification and/or the like). Front housing component 219F may be produced using any suitable methodology(ies), including, but not limited to, three-dimensional printing, laser cutting, injection molding, such as a single injection molding operation (e.g., plastic injection molding) with any suitable slider(s) (e.g., metal slider(s)) that may be used to generate one or more passageways (e.g., a fork shaped slider that may form a passageway that may be bifurcated at a portion along its path). A passageway opening (e.g., opening 2220) provided through the exterior surface of one or more housing walls may be any suitable shape(s) and size(s) and may be made through any suitable geometry of any suitable external surface(s) of any suitable wall(s) (e.g., flat and planar, flat along a curved surface or curved along a curved surface, etc.). In some embodiments, as shown, opening 2220 may be made through a flat wall surface of wall 211B and/or through a flat wall surface of wall 211R and/or a conjoining corner thereof (e.g., rather than also or alternatively through any curved wall surface of wall 211B and/or of wall 211R (e.g., in the Z-direction)). For example, as shown in FIG. 4, while height H may be a total height of device 220, a height 222oh of opening 2220 may be a height of a flat surface defining a portion of height H. For example, width W may be about 53.98 millimeters or between 50-60 millimeters or under 60.00 millimeters, length L may be 85.60 millimeters or between 80-90 millimeters or under 90.00 millimeters, each corner may be a rounded corner with a radius of 2.88-3.48 millimeters, and/or height H may be 0.76 millimeters or any other suitable height such as between 0.40 millimeters and 10.00 millimeters or under 5 millimeters or under 2.00 millimeters or under 1 millimeter, where height 222oh may be 0.50 millimeters or any other suitable height such as between 0.25 millimeters and 8.00 millimeters or under 5 millimeters or under 2.00 millimeters or under 1 millimeter or 0.75 millimeters or 0.60 millimeters or 0.45 millimeters (e.g., any suitable portion of height H). In other embodiments, rather than having a width and length, device 220 may be circular with a diameter D (not shown), which may be between 40-90 millimeters or under 80 millimeters or under 50 millimeters, while its height H may be 0.76 millimeters or any other suitable height such as between 0.40 millimeters and 10.00 millimeters or under 5 millimeters or under 2.00 millimeters or under 1 millimeter, where its height 222oh of a passageway opening 2220 may be 0.50 millimeters or any other suitable height such as between 0.25 millimeters and 8.00 millimeters or under 5 millimeters or under 2.00 millimeters or under 1 millimeter or 0.75 millimeters or 0.60 millimeters or 0.45 millimeters (e.g., any suitable portion of height H) (e.g., any suitable portion of height H).

As mentioned, component 216 may be positioned at least partially within well 219w provided by housing component 219F and coupled thereto (e.g., front surface 216F of component 216 may be coupled to portions of well ledge 219wl that may define an upper outer rim of well 219w) in any suitable manner (e.g., via a glue or other suitable adhesive). Well 219w may define a portion of space 211s. When component 216 is a speaker (e.g., piezoelectric and/or membrane speaker or any other suitable transceiver), front surface 216F may be a wide ledge of the speaker and its interface with well ledge 219wl or any other suitable portion of housing 211 (e.g., a coupled interface (e.g., via any suitable glue or adhesive or ultrasonic welding or otherwise)) may be utilized to at least partially define a sound cavity 219c (e.g., a space or volume (e.g., a portion of space 211s)) between a passageway surface 216p of component 216 and an inner surface of housing component 219F (e.g., an inner surface 211Fi of front wall 211F). Therefore, a protected space for being communicatively coupled with the device's ambient environment may include passageway 222, which may include passageway portions 232A and 232B, via opening 2220 and sound cavity 219c within space 211s. However, this protected space may be waterproofed for preventing any fluid therein from being passed to another space within space 211s, such as a battery space 211bs that may include any other suitable components of device 220, such as a battery 217 that may need to be protected from water. Passageway surface 216p of component 216 maybe a membrane or any other suitable active component feature that may be moved or otherwise used to generate sound (e.g., mechanical motion (e.g., spring motion) via an applied voltage to a piezoelectric material) for communication to the device's ambient environment via passageway 222 and/or used to detect sound communicated from the device's ambient environment via passageway 222 and/or the like.

Housing 211 of device 220 may be manufactured using any suitable technique(s), including, but not limited to, injection molding (e.g., front housing component 211F may be all one part that may be injection molded using sliders (e.g., a fork shaped metal slider may be removed from passageway portions 232A and 232B after an injection molding operation (e.g., plastic injection))).

In some embodiments, an electronic tracking device (e.g., device 220) is provided that may include a housing defining a housing space (e.g., housing 211 defining housing space 211s), wherein the housing includes a housing wall with an exterior housing wall surface defining at least a portion of an exterior of the housing (e.g., an exterior wall surface of wall 211R and/or wall 211B), the exterior housing wall surface is less than 5.0 millimeters in at least a first dimension (e.g., the exterior housing wall surface may have height H or height 222oh), the exterior housing wall surface includes a passageway opening therethrough (e.g., opening 2220), and the housing space includes a communication component space (e.g., housing space 211s includes cavity 219c), and a passageway extending between the communication component space and the passageway opening (e.g., passageway 222 extending between cavity 219c and opening 2220). The electronic tracking device may also include a processor (e.g., component 216ss) positioned within the housing space, a battery (e.g., component 217) positioned within the housing space and coupled to the processor, and a communication component (e.g., component 216) positioned within the communication component space and operative to communicate fluid with an environment external to the housing via the passageway. In some embodiments, the exterior of the housing may be less than 5.0 millimeters in the first dimension (e.g., height H of device 220 may be less than 5.0 millimeters). In some embodiments, the exterior of the housing may be less than 1.0 millimeter in the first dimension (e.g., height H of device 220 may be less than 1.0 millimeter). In some embodiments, the exterior housing wall surface may be less than 0.75 millimeters in the first dimension (e.g., height 222oh may be less than 0.75 millimeters). In some embodiments, the passageway opening may be less than 0.75 millimeters in the first dimension (e.g., height 222oh may be less than 0.75 millimeters). In some embodiments, the exterior of the housing may be less than 1.0 millimeter in the first dimension (e.g., height H of device 220 may be less than 1.0 millimeter) and the exterior of the housing may be less than 90.0 millimeters in a second dimension perpendicular to the first dimension (e.g., length L of device 220 may be less than 90.0 millimeters). Additionally, in some embodiments, the exterior of the housing may be less than 60.0 millimeters in a third dimension perpendicular to each of the first dimension and the second dimension (e.g., width W of device 220 may be less than 60.0 millimeters). In some embodiments, the exterior housing wall surface may be a curved surface (e.g., the curved corner surface through which opening 2220 is provided (see, e.g., FIG. 4D)). Additionally, in some embodiments, the exterior housing wall surface is flat in the first dimension (e.g., the height of the exterior wall surface is flat (e.g., along the Z-direction)). In some embodiments, the housing may include a first housing component and a second housing component coupled to the first housing component (e.g., housing component 219F coupled to housing component 219K). Additionally, in some embodiments, the housing space may be between the first housing component and the second housing component (e.g., space 211s may be between housing components 219F and 219K), and/or the first housing component may include the housing wall (e.g., housing component 219F may include wall 211R and/or wall 211B), and/or the second housing component may be coupled to the first housing component by a watertight housing component coupling interface (e.g., interface 221), and/or the communication component may be coupled to the housing within the communication component space by a watertight communication component coupling interface (e.g., interface 218), and/or the watertight housing component coupling interface extends about the watertight communication component coupling interface (e.g., interface 221 may extend about interface 218), and/or the passageway may extend above and beyond each one of the watertight communication component coupling interface and the watertight housing component coupling interface (e.g., passageway 222 may extend above and beyond interface 221 and interface 218 (see, e.g., FIG. 5C)). In some embodiments, the communication component may be coupled to the housing within the communication component space by a watertight communication component coupling interface (e.g., interface 218).

In some other embodiments, an electronic tracking device (e.g., device 220) is provided that may include a housing defining a housing space (e.g., housing 211 may define housing space 211s), wherein the housing includes a housing wall with an exterior housing wall surface defining at least a portion of an exterior of the housing (e.g., wall 211R and/or wall 211B), the exterior housing wall surface includes a passageway opening (e.g., opening 2220) through the exterior housing wall surface, the passageway opening is less than 1.0 millimeter tall (e.g., height 222oh may be less than 1.0 millimeter tall), and the housing space includes an internal component space (e.g., cavity 219c), and a passageway extending between the internal component space and the passageway opening (e.g., passageway 222). The electronic tracking device may also include an audio component (e.g., component 216) positioned within the internal component space and operative to communicate soundwaves with an environment external to the housing via the passageway.

In yet some other embodiments, an electronic tracking device (e.g., device 220) is provided that may include a housing defining an internal housing space (e.g., housing 211 may define housing space 211s), and an internal component (e.g., component 216) positioned within the internal housing space, wherein the housing includes at least one housing wall with an exterior housing wall surface (e.g., wall 211R and/or wall 211B), the housing space includes a passageway (e.g., passageway 222) extending between the internal component and an environment external to the housing via an opening (e.g., opening 2220) in the exterior housing wall surface, and the opening is less than 5.0 millimeters in at least one dimension (e.g., height 222oh may be less than 5.0 millimeters).

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein may refer to and encompass any and all possible combinations of one or more of the associated listed items. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" may each refer to only A, only B, or only C; any combination of A, B, and C; and/or at least one of each of A, B, and C. The terms "includes," "including," "comprises," and/or "comprising," when used in this specification, specify the presence of stated features, integers, steps, operations, processes, elements, and/or components, but do not preclude the presence or addition of one or more other features, integers, steps, operations, processes, elements, components, and/or groups thereof. When used in the claims, the term "or" is used as an inclusive or and not as an exclusive or. For example, the phrase "at least one of x, y, or z" means any one of x, y, and z, as well as any combination thereof.

The term "if" may, optionally, be construed to mean "when" or "upon" or "in response to determining" or "in response to detecting," depending on the context. Similarly, the phrase "if it is determined" or "if [a stated condition or event] is detected" may, optionally, be construed to mean "upon determining" or "in response to determining" or "upon detecting [the stated condition or event]" or "in response to detecting [the stated condition or event]," depending on the context.

As used herein, the terms "computer," "personal computer," "device," "computing device," "router device," and "controller device" may refer to any programmable computer system that is known or that will be developed in the future. In certain embodiments, a computer may be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system" may be intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The predicate words "configured to," "operable to," "operative to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation or the processor being operative to monitor and control the operation. Likewise, a processor configured to execute code can be construed as a processor programmed to execute code or operable to execute code or operative to execute code.

As used herein, the term "based on" may be used to describe one or more factors that may affect a determination. However, this term does not exclude the possibility that additional factors may affect the determination. For example, a determination may be solely based on specified factors or based on the specified factors as well as other, unspecified factors. The phrase "determine A based on B" specifies that B is a factor that is used to determine A or that affects the determination of A. However, this phrase does not exclude that the determination of A may also be based on some other factor, such as C. This phrase is also intended to cover an embodiment in which A may be determined based solely on B. As used herein, the phrase "based on" may be synonymous with the phrase "based at least in part on."

As used herein, the phrase "in response to" may be used to describe one or more factors that trigger an effect. This phrase does not exclude the possibility that additional factors may affect or otherwise trigger the effect. For example, an effect may be solely in response to those factors, or may be in response to the specified factors as well as other, unspecified factors. The phrase "perform A in response to B" specifies that B is a factor that triggers the performance of A. However, this phrase does not foreclose that performing A may also be in response to some other factor, such as C. This phrase is also intended to cover an embodiment in which A is performed solely in response to B.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter/neutral gender (e.g., her and its and they) and vice versa. Headings and subheadings, if any, are used for convenience only and do not limit the subject disclosure.

While there have been described electronic devices with sidewall passageways and methods for making and using the same, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "left" and "right," "edge" and "corner," "front" and "back," "top" and "bottom" and "side," "above" and "below," "length" and "width" and "thickness" and "diameter" and "cross-section" and "longitudinal," "X-" and "Y-" and "Z-," and/or the like, may be used herein only for convenience, and that no fixed or absolute directional or orientational limitations are intended by the use of these terms. For example, the components of the system can have any desired orientation. If reoriented, different directional or orientational terms may need to be used in their description, but that will not alter their fundamental nature as within the scope and spirit of the subject matter described herein in any way.

Therefore, those skilled in the art will appreciate that the concepts of the disclosure can be practiced by other than the described embodiments, which are presented for purposes of illustration rather than of limitation.

What is claimed is:

1. An electronic tracking device comprising:
   a housing defining a housing space, wherein:
      the housing comprises a housing wall with an exterior housing wall surface defining at least a portion of an exterior of the housing;
      the exterior housing wall surface is less than 5.0 millimeters in at least a first dimension;
      the exterior housing wall surface comprises a passageway opening therethrough; and
      the housing space comprises:
         a communication component space; and
         a passageway extending between the communication component space and the passageway opening;
   a processor positioned within the housing space;
   a battery positioned within the housing space and coupled to the processor; and
   a communication component coupled to the processor and positioned within the communication component space and operative to communicate fluid with an environment external to the housing via the passageway.

2. The electronic tracking device of claim 1, wherein the exterior of the housing is less than 5.0 millimeters in the first dimension.

3. The electronic tracking device of claim 1, wherein the exterior of the housing is less than 1.0 millimeter in the first dimension.

4. The electronic tracking device of claim 3, wherein the exterior housing wall surface is less than 0.75 millimeters in the first dimension.

5. The electronic tracking device of claim 1, wherein the exterior housing wall surface is less than 0.75 millimeters in the first dimension.

6. The electronic tracking device of claim 1, wherein the passageway opening is less than 0.75 millimeters in the first dimension.

7. The electronic tracking device of claim 1, wherein:
the exterior of the housing is less than 1.0 millimeter in the first dimension; and
the exterior of the housing is less than 90.0 millimeters in a second dimension perpendicular to the first dimension.

8. The electronic tracking device of claim 7, wherein the exterior of the housing is less than 60.0 millimeters in a third dimension perpendicular to each of the first dimension and the second dimension.

9. The electronic tracking device of claim 1, wherein the exterior housing wall surface is a curved surface.

10. The electronic tracking device of claim 9, wherein the exterior housing wall surface is flat in the first dimension.

11. The electronic tracking device of claim 1, wherein the housing comprises:
a first housing component; and
a second housing component coupled to the first housing component.

12. The electronic tracking device of claim 11, wherein the housing space is between the first housing component and the second housing component.

13. The electronic tracking device of claim 11, wherein the first housing component comprises the housing wall.

14. The electronic tracking device of claim 11, wherein the second housing component is coupled to the first housing component by a watertight housing component coupling interface.

15. The electronic tracking device of claim 14, wherein the communication component is coupled to the housing within the communication component space by a watertight communication component coupling interface.

16. The electronic tracking device of claim 15, wherein the watertight housing component coupling interface extends about the watertight communication component coupling interface.

17. The electronic tracking device of claim 16, wherein the passageway extends above and beyond each one of:
the watertight communication component coupling interface; and
the watertight housing component coupling interface.

18. The electronic tracking device of claim 1, wherein the communication component is coupled to the housing within the communication component space by a watertight communication component coupling interface.

19. An electronic tracking device comprising:
a housing defining a housing space, wherein:
the housing comprises a housing wall with an exterior housing wall surface defining at least a portion of an exterior of the housing;
the exterior housing wall surface comprises a passageway opening through the exterior housing wall surface;
the passageway opening is less than 1.0 millimeter tall; and
the housing space comprises:
an internal component space; and
a passageway extending between the internal component space and the passageway opening; and
an audio component positioned within the internal component space and operative to communicate soundwaves with an environment external to the housing via the passageway.

20. An electronic tracking device comprising:
a housing defining an internal housing space; and
an internal component positioned within the internal housing space, wherein:
the housing comprises at least one housing wall with an exterior housing wall surface;
the internal housing space comprises a passageway extending between the internal component and an environment external to the housing via an opening in the exterior housing wall surface; and
the opening is less than 2.0 millimeters in at least one dimension.

21. The electronic tracking device of claim 20, wherein the opening is less than 0.60 millimeters in the at least one dimension.

* * * * *